(12) United States Patent
Li et al.

(10) Patent No.: US 11,782,236 B2
(45) Date of Patent: Oct. 10, 2023

(54) CAMERA OPTICAL LENS

(71) Applicant: AAC Optics (Changzhou) Co., Ltd., Changzhou (CN)

(72) Inventors: Wanxia Li, Shenzhen (CN); Li Liu, Shenzhen (CN)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 401 days.

(21) Appl. No.: 17/131,763

(22) Filed: Dec. 23, 2020

(65) Prior Publication Data

US 2022/0107481 A1  Apr. 7, 2022

(30) Foreign Application Priority Data

Feb. 24, 2020   (CN) .......................... 202010111391.X

(51) Int. Cl.
*G02B 13/00* (2006.01)
*G02B 9/62* (2006.01)

(52) U.S. Cl.
CPC ........... *G02B 9/62* (2013.01); *G02B 13/0045* (2013.01)

(58) Field of Classification Search
CPC ...... G02B 9/62; G02B 13/0045; G02B 13/06; G02B 13/18; G02B 9/64
See application file for complete search history.

(56) References Cited

U.S. PATENT DOCUMENTS

| | | | | |
|---|---|---|---|---|
| 9,964,739 B1 * | 5/2018 | Shi | ...................... | G02B 13/0045 |
| 2013/0148006 A1 * | 6/2013 | Yoshinaga | ............... | G02B 9/14 |
| | | | | 359/708 |
| 2022/0091384 A1 * | 3/2022 | Meng | ................. | G02B 13/0045 |

FOREIGN PATENT DOCUMENTS

| | | | | | |
|---|---|---|---|---|---|
| JP | 2019008166 A | * | 1/2019 | ......... | G02B 13/0045 |
| JP | 6588581 B2 | * | 10/2019 | ............... | G02B 1/00 |
| WO | WO-2020024631 A1 | * | 2/2020 | ......... | G02B 13/0045 |

* cited by examiner

*Primary Examiner* — George G. King
*Assistant Examiner* — Anna Elizabeth Smith
(74) *Attorney, Agent, or Firm* — W&G Law Group

(57) ABSTRACT

Provided is a camera optical lens, which includes a first lens having a negative refractive power, a second lens having a positive refractive power, a third lens having a positive refractive power, a fourth lens having a negative refractive power, a fifth lens having a positive refractive power, and a sixth lens having a negative refractive power. The camera optical lens satisfies $-10.00 \leq f1/f \leq -4.00$, $0.40 \leq f5/f \leq 0.70$, and $8.00 \leq d5/d6 \leq 15.00$, where f denotes a focal length of the camera optical lens; f1 denotes a focal length of the first lens; f5 denotes a focal length of the fifth lens; d5 denotes an on-axis thickness of the third lens; and d6 denotes an on-axis distance from an image side surface of the third lens to an object side surface of the fourth lens. The camera optical lens has good optical performance and satisfies design requirements for ultra-thin, wide-angle lenses having large apertures.

9 Claims, 15 Drawing Sheets

CAMERA OPTICAL LENS

TECHNICAL FIELD

The present disclosure relates to the field of optical lens, and more particularly, to a camera optical lens suitable for handheld terminal devices such as smart phones or digital cameras and camera devices such as monitors or PC lenses.

BACKGROUND

With the emergence of smart phones in recent years, the demand for miniature camera lens is constantly increasing. However, the photosensitive devices of camera lens are generally limited to Charge Coupled Device (CCD) or Complementary Metal-Oxide Semiconductor Sensor (CMOS sensor). In addition, with the advance of the semiconductor manufacturing technology, the pixel size of the photosensitive devices become smaller, accompanying with the current development trend of electronic products towards better functions and thinner and smaller dimensions, miniature camera lenses with good imaging quality therefore have become a mainstream in the market.

In order to obtain better imaging quality, the lens that is conventionally equipped in mobile phone cameras adopts a three-piece or four-piece lens structure. Also, with the development of technology and the increasingly diverse demands of users, the pixel area of photosensitive devices is becoming smaller and smaller and the requirement of the system on the imaging quality is increasingly higher, such that a six-piece lens structure gradually emerges in lens designs. Therefore, it is urgent to provide a wide-angle camera lens with excellent optical characteristics, ultra-thin and fully corrected chromatic aberrations.

SUMMARY

In view of the problems, the present disclosure provides a camera optical lens, which can achieve good optical performance while satisfying design requirements for ultra-thin, wide-angle lenses having large apertures.

In an embodiment, the present disclosure provides a camera optical lens. The camera optical lens sequentially includes, from an object side to an image side: a first lens having a negative refractive power, a second lens having a positive refractive power, a third lens having a positive refractive power, a fourth lens having a negative refractive power, a fifth lens having a positive refractive power, and a sixth lens having a negative refractive power. The camera optical lens satisfies following conditions: $-10.00 \leq f1/f \leq -4.00$; $0.40 \leq f5/f \leq 0.70$; and $8.00 \leq d5/d6 \leq 15.00$, where f denotes a focal length of the camera optical lens; f1 denotes a focal length of the first lens; f5 denotes a focal length of the fifth lens; d5 denotes an on-axis thickness of the third lens; and d6 denotes an on-axis distance from an image side surface of the third lens to an object side surface of the fourth lens.

As an improvement, the camera optical lens further satisfies a following condition: $0.00 \leq (R7+R8)/(R7-R8) \leq 1.00$, where R7 denotes a curvature radius of the object side surface of the fourth lens; and R8 denotes a curvature radius of an image side surface of the fourth lens.

As an improvement, the camera optical lens further satisfies a following condition: $5.00 \leq R9/R10 \leq 20.00$, where R9 denotes a curvature radius of an object side surface of the fifth lens; and R10 denotes a curvature radius of an image side surface of the fifth lens.

As an improvement, the camera optical lens further satisfies following conditions: $-10.92 \leq (R1+R2)/(R1-R2) \leq -0.33$; and $0.02 \leq d1/TTL \leq 0.06$, where R1 denotes a curvature radius of an object side surface of the first lens; R2 denotes a curvature radius of an image side surface of the first lens; d1 denotes an on-axis thickness of the first lens; and TTL denotes a total optical length from the object side surface of the first lens to an image plane of the camera optical lens along an optic axis.

As an improvement, the camera optical lens further satisfies following conditions: $0.60 \leq f2/f \leq 2.23$; $-2.76 \leq (R3+R4)/(R3-R4) \leq -0.59$; and $0.04 \leq d3/TTL \leq 0.13$, where f2 denotes a focal length of the second lens; R3 denotes a curvature radius of an object side surface of the second lens; R4 denotes a curvature radius of an image side surface of the second lens; d3 denotes an on-axis thickness of the second lens; and TTL denotes a total optical length from an object side surface of the first lens to an image plane of the camera optical lens along an optic axis.

As an improvement, the camera optical lens further satisfies following conditions: $0.87 \leq f3/f \leq 4.31$; $0.54 \leq (R5+R6)/(R5-R6) \leq 3.49$; and $0.04 \leq d5/TTL \leq 0.13$, where f3 denotes a focal length of the third lens; R5 denotes a curvature radius of an object side surface of the third lens; R6 denotes a curvature radius of the image side surface of the third lens; and TTL denotes a total optical length from an object side surface of the first lens to an image plane of the camera optical lens along an optic axis.

As an improvement, the camera optical lens further satisfies following conditions: $-4.43 \leq f4/f \leq -1.05$; and $0.02 \leq d7/TTL \leq 0.09$, where f4 denotes a focal length of the fourth lens; d7 denotes an on-axis thickness of the fourth lens; and TTL denotes a total optical length from an object side surface of the first lens to an image plane of the camera optical lens along an optic axis.

As an improvement, the camera optical lens further satisfies following conditions: $0.55 \leq (R9+R10)/(R9-R10) \leq 2.25$; and $0.09 \leq d9/TTL \leq 0.38$, where R9 denotes a curvature radius of an object side surface of the fifth lens; R10 denotes a curvature radius of an image side surface of the fifth lens; d9 denotes an on-axis thickness of the fifth lens; and TTL denotes a total optical length from an object side surface of the first lens to an image plane of the camera optical lens along an optic axis.

As an improvement, the camera optical lens further satisfies following conditions: $-1.43 \leq f6/f \leq -0.26$; $0.54 \leq (R11+R12)/(R11-R12) \leq 2.93$; and $0.03 \leq d11/TTL \leq 0.13$, where f6 denotes a focal length of the sixth lens; R11 denotes a curvature radius of an object side surface of the sixth lens; R12 denotes a curvature radius of an image side surface of the sixth lens; d11 denotes an on-axis thickness of the sixth lens; and TTL denotes a total optical length from an object side surface of the first lens to an image plane of the camera optical lens along an optic axis.

As an improvement, the camera optical lens further satisfies a following condition: $TTL/IH \leq 1.65$, where TTL denotes a total optical length from an object side surface of the first lens to an image plane of the camera optical lens along an optic axis; and IH denotes an image height of the camera optical lens.

The present disclosure has the following beneficial effects. The camera optical lens according to the present disclosure has excellent optical characteristics and is ultra-thin, wide-angle and has a large aperture, making it especially suitable for camera optical lens assembly of mobile phones and WEB camera optical lenses formed by high-pixel camera elements such as CCD and CMOS.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood that the specific embodiments described hereby is only to explain the disclosure, not intended to limit the disclosure.

Embodiment 1

Figure 1:
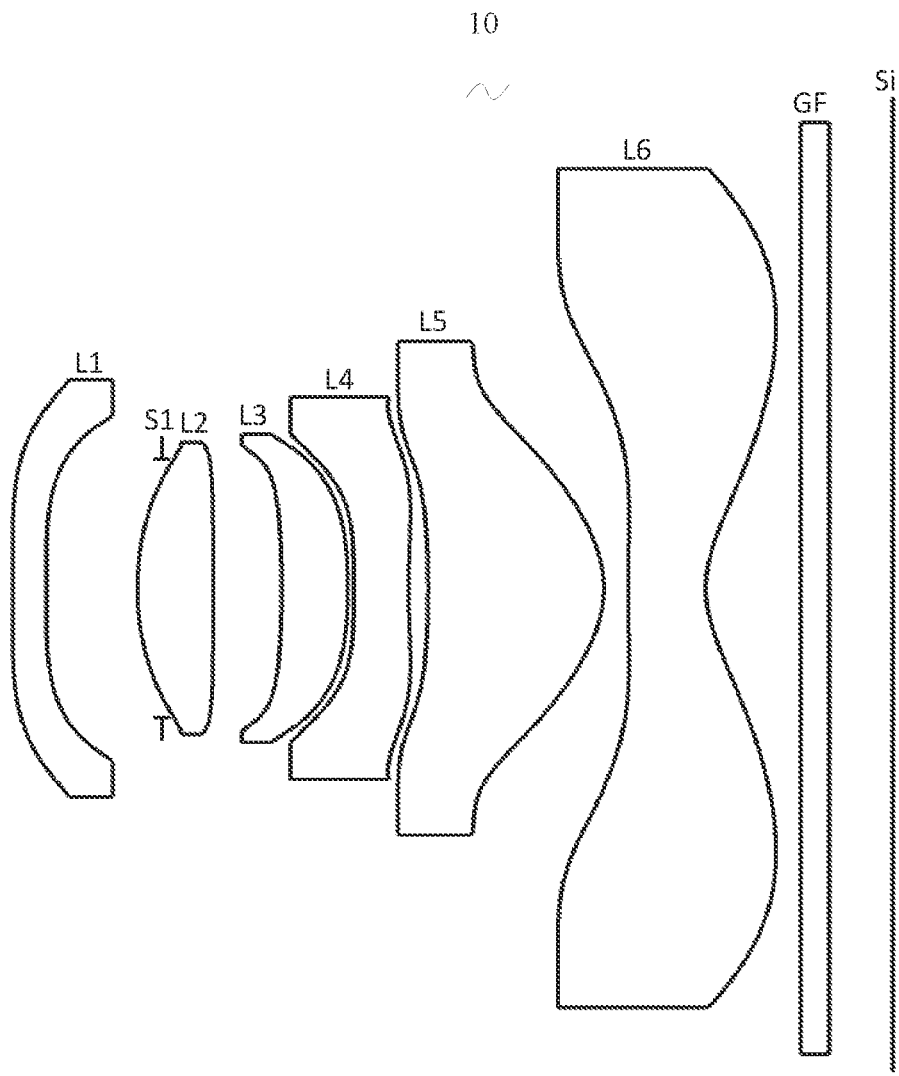
FIG. 1 is a structural schematic diagram of a camera optical lens according to Embodiment 1 of the present disclosure.

The present disclosure provides a camera optical lens 10. FIG. 1 shows the camera optical lens 10 according to Embodiment 1 of the present disclosure. The camera optical lens 10 includes six lenses. For example, the camera optical lens 10 includes, from an object side to an image side, a first lens L1, an aperture S1, a second lens L2, a third lens L3, a fourth lens L4, a fifth lens L5, and a sixth lens L6. An optical element such as an optical filter (GF) can be arranged between the sixth lens L6 and an image plane Si.

The first lens L1 has a negative refractive power, the second lens L2 has a positive refractive power, the third lens L3 has a positive refractive power, the fourth lens L4 has a negative refractive power, the fifth lens L5 has a positive refractive power, and the sixth lens L6 has a negative refractive power.

The first lens L1 is made of a plastic material, the second lens L2 is made of a plastic material, the third lens L3 is made of a plastic material, the fourth lens L4 is made of a plastic material, the fifth lens L5 is made of a plastic material, and the sixth lens L6 is made of a plastic material.

In the present embodiment, a focal length of the camera optical lens 10 is defined as f, and a focal length of the first lens L1 is defined as f1. The camera optical lens 10 should satisfy a condition of $-10.00 \leq f1/f \leq -4.00$, which specifies a ratio of the focal length f1 of the first lens L1 to the focal length f of the system. When this condition is satisfied, a spherical aberration and the field curvature of the system can be effectively balanced.

The focal length of the camera optical lens 10 is f, and a focal length of the fifth lens L5 is f5. The camera optical lens 10 should satisfy a condition of $0.40 \leq f5/f \leq 0.70$, which specifies a ratio of the focal length f5 of the first lens L5 to the focal length f of the system. Through appropriate distribution of the focal length, the system can have a better imaging quality and a lower sensitivity.

An on-axis thickness of the third lens L3 is defined as d5, and an on-axis distance from an image side surface of the third lens L3 to an object side surface of the fourth lens L4 is defined as d6. The camera optical lens 10 should satisfy a condition of $8.00 \leq d5/d6 \leq 15.00$, which specifies a ratio of the thickness of the third lens L3 and an air interval between the third lens L3 and the fourth lens L4. This condition can reduce a total length of the optical system, thereby achieving the ultra-thin effect.

A curvature radius of the object side surface of the fourth lens L4 is defined as R7, and a curvature radius of an image side surface of the fourth lens L4 is defined as R8. The camera optical lens 10 should satisfy a condition of $0.00 \leq (R7+R8)/(R7-R8) \leq 1.00$, which specifies a shape of the fourth lens L4. This condition can alleviate the deflection of light passing through the lens while effectively reducing aberrations.

A curvature radius of an object side surface of the fifth lens L5 is defined as R9, and a curvature radius of an image side surface of the fifth lens L5 is defined as R10. The camera optical lens 10 should satisfy a condition of $5.00 \leq R9/R10 \leq 20.00$, which specifies a shape of the fifth lens L5. This condition can facilitate the correction of an off-axis aberration with development towards ultra-thin lenses.

In the present embodiment, the first lens L1 includes an object side surface being concave in a paraxial region and an image side surface being concave in the paraxial region.

A curvature radius of an object side surface of the first lens L1 is defined as R1, and a curvature radius of an image side surface of the first lens L1 is defined as R2. The camera optical lens 10 should satisfy a condition of $-10.92 \leq (R1+R2)/(R1-R2) \leq -0.33$, which can reasonably control a shape of the first lens L1, allowing the first lens L1 to effectively correct spherical aberrations of the system. As an example, $-6.83 \leq (R1+R2)/(R1-R2) \leq -0.41$.

A total optical length from the object side surface of the first lens L1 to an image plane of the camera optical lens 10 along an optic axis is defined as TTL, and an on-axis thickness of the first lens L1 is defined as d1. The camera optical lens 10 should satisfy a condition of $0.02 \leq d1/TTL \leq 0.06$. This condition can facilitate achieving ultra-thin lenses. As an example, $0.03 \leq d1/TTL \leq 0.05$.

In the present embodiment, the second lens L2 includes an object side surface being convex in a paraxial region and an image side surface being convex in the paraxial region.

The focal length of the camera optical lens 10 is f, and a focal length of the second lens L2 is f2. The camera optical lens 10 further satisfies a condition of $0.60 \leq f2/f \leq 2.23$. By controlling a positive refractive power of the second lens L2 within a reasonable range, the aberrations of the optical system can be advantageously corrected. As an example, $0.96 \leq f2/f \leq 1.79$.

A curvature radius of an object side surface of the second lens L2 is defined as R3, and a curvature radius of an image side surface of the second lens L2 is defined as R4. The camera optical lens 10 should satisfy a condition of $-2.76 \leq (R3+R4)/(R3-R4) \leq -0.59$, which specifies a shape of the second lens L2. This condition can facilitate the correction of an on-axis aberration with development towards the ultra-thin lenses. As an example, $-1.73 \leq (R3+R4)/(R3-R4) \leq -0.73$.

An on-axis thickness of the second lens L2 is defined as d3, and the total optical length from the object side surface of the first lens L1 to an image plane of the camera optical lens 10 along an optic axis is defined as TTL. The camera optical lens 10 should satisfy a condition of $0.04 \leq d3/TTL \leq 0.13$, which can achieve the ultra-thin lenses. As an example, $0.06 \leq d3/TTL \leq 0.11$.

In the present embodiment, the third lens L3 includes an object side surface being concave in a paraxial region and an image side surface being convex in the paraxial region.

The focal length of the camera optical lens 10 is defined as f, and a focal length of the third lens L3 is defined as f3. The camera optical lens 10 further satisfies a condition of $0.87 \leq f3/f \leq 4.31$. The appropriate distribution of the refractive power leads to better imaging quality and a lower sensitivity of the system. As an example, $1.39 \leq f3/f \leq 3.45$.

A curvature radius of an object side surface of the third lens L3 is defined as R5, and a curvature radius of an image side surface of the third lens L3 is defined as R6. The camera optical lens 10 should satisfy a condition of $0.54 \leq (R5+R6)/(R5-R6) \leq 3.49$, which can effectively control a shape of the third lens L3, thereby facilitating shaping of the third lens L3. This condition can alleviate the deflection of light passing through the lens while effectively reducing aberrations. As an example, $0.86 \leq (R5+R6)/(R5-R6) \leq 2.79$.

An on-axis thickness of the third lens L3 is defined as d5, and the total optical length from the object side surface of the first lens L1 to an image plane of the camera optical lens 10 along an optic axis is defined as TTL. The camera optical lens 10 should satisfy a condition of $0.04 \leq d5/TTL \leq 0.13$. This condition can facilitate achieving ultra-thin lenses. As an example, $0.06 \leq d5/TTL \leq 0.11$.

In the present embodiment, the fourth lens L4 includes an object side surface being concave in a paraxial region and an image side surface being concave in the paraxial region.

The focal length of the camera optical lens 10 is f, and a focal length of the fourth lens L4 is f4. The camera optical lens 10 further satisfies a condition of $-4.43 \leq f4/f \leq -1.05$, which specifies a ratio of the focal length f4 of the fourth lens L4 and the focal length of the system. This condition can facilitate the improvement of an optical performance of the system. As an example, $-2.77 \leq f4/f \leq -1.32$.

An on-axis thickness of the fourth lens L4 is defined as d7, and the total optical length from the object side surface of the first lens L1 to an image plane of the camera optical lens 10 along an optic axis is defined as TTL. The camera optical lens 10 should satisfy a condition of $0.02 \leq d7/TTL \leq 0.09$, which can facilitate achieving ultra-thin lenses. As an example, $0.04 \leq d7/TTL \leq 0.07$.

In the present embodiment, the fifth lens L5 includes an object side surface being concave in a paraxial region and an image side surface being convex in the paraxial region.

A curvature radius of an object side surface of the fifth lens L5 is defined as R9, and a curvature radius of an image side surface of the fifth lens L5 is defined as R10. The camera optical lens 10 should satisfy a condition of $0.55 \leq (R9+R10)/(R9-R10) \leq 2.25$, which specifies a shape of the fifth lens L5. This condition can facilitate correction of an off-axis aberration with development towards ultra-thin lenses. As an example, $0.88 \leq (R9+R10)/(R9-R10) \leq 1.80$.

An on-axis thickness of the fifth lens L5 is defined as d9, and the total optical length from the object side surface of the first lens L1 to an image plane of the camera optical lens 10 along an optic axis is defined as TTL. The camera optical lens 10 should satisfy a condition of $0.09 \leq d9/TTL \leq 0.38$, which can facilitate achieving ultra-thin lenses. As an example, $0.15 \leq d9/TTL \leq 0.30$.

In the present embodiment, the sixth lens L6 includes an object side surface being convex in a paraxial region and an image side surface being concave in the paraxial region.

The focal length of the camera optical lens 10 is defined as f, and a focal length of the sixth lens L6 is defined as f6. The camera optical lens 10 further satisfies a condition of $-1.43 \leq f6/f \leq -0.26$. The appropriate distribution of the refractive power leads to better imaging quality and a lower sensitivity of the system. As an example, $-0.90 \leq f6/f \leq -0.33$.

A curvature radius of an object side surface of the sixth lens L6 is defined as R11, and a curvature radius of an image side surface of the sixth lens L6 is defined as R12. The camera optical lens 10 should satisfy a condition of $0.54 \leq (R11+R12)/(R11-R12) \leq 2.93$, which specifies a shape of the sixth lens L6. This condition can facilitate the correction of an off-axis aberration with development towards ultra-thin lenses. As an example, $0.86 \leq (R11+R12)/(R11-R12) \leq 2.34$.

An on-axis thickness of the sixth lens L6 is defined as d11, and the total optical length from the object side surface of the first lens L1 to an image plane of the camera optical lens 10 along an optic axis is defined as TTL. The camera optical lens 10 should satisfy a condition of $0.03 \leq d11/TTL \leq 0.13$, which can facilitate achieving ultra-thin lenses. As an example, $0.05 \leq d11/TTL \leq 0.11$.

In the present embodiment, the total optical length from the object side surface of the first lens L1 to an image plane of the camera optical lens 10 along an optic axis is defined as TTL, and an image height of the camera optical lens 10 is defined as IH. The camera optical lens 10 should satisfy a condition of $TTL/IH \leq 1.65$, which can facilitate achieving ultra-thin lenses.

In the present embodiment, an F number (FNO) of the camera optical lens 10 is smaller than or equal to 1.75, thereby achieving a large aperture and high imaging performance.

In the present embodiment, the focal length of the camera optical lens 10 is defined as f, and a combined focal length of the first lens L1 and the second lens L2 as defined as f12. The camera optical lens 10 should satisfy a condition of 0.74≤f12/f≤2.73. This condition can eliminate aberration and distortion of the camera optical lens 10, suppress the back focal length of the camera optical lens 10, and maintain the miniaturization of the camera lens system group. As an example, 1.18≤f12/f≤2.19.

When the above conditions are satisfied, the camera optical lens 10 can have good optical performance while satisfying design requirements for ultra-thin, wide-angle lenses having large apertures. With these characteristics, the camera optical lens 10 is especially suitable for camera optical lens assembly of mobile phones and WEB camera optical lenses formed by high-pixel imaging elements such as CCD and CMOS.

The following examples will be used to describe the camera optical lens 10 of the present disclosure. The symbols recorded in each example will be described as follows. The focal length, on-axis distance, curvature radius, on-axis thickness, inflexion point position, and arrest point position are all in units of mm.

TTL: total optical length (total optical length from the object side surface of the first lens L1 to the image plane of the camera optical lens along the optic axis), in units of mm.

In an example, inflexion points and/or arrest points can be arranged on the object side surface and/or image side surface of the lens, so as to satisfy the demand for the high quality imaging. The description below can be referred to for specific implementations.

Table 1 and Table 2 shows design data of the camera optical lens 10 according to Embodiment 1 of the present disclosure.

TABLE 1

|     | R          | d     |      | nd     |    | vd    |
|-----|------------|-------|------|--------|----|-------|
| S1  | ∞          | d0 =  | −1.111 |      |    |       |
| R1  | −17.279    | d1 =  | 0.248 | nd1  | 1.5444 | v1 | 55.82 |
| R2  | 50.226     | d2 =  | 0.681 |      |    |       |
| R3  | 2.406      | d3 =  | 0.565 | nd2  | 1.5444 | v2 | 55.82 |
| R4  | −20925.533 | d4 =  | 0.511 |      |    |       |
| R5  | −10.146    | d5 =  | 0.496 | nd3  | 1.5444 | v3 | 55.82 |
| R6  | −3.406     | d6 =  | 0.046 |      |    |       |
| R7  | −9.149     | d7 =  | 0.407 | nd4  | 1.6610 | v4 | 20.53 |
| R8  | 6.535      | d8 =  | 0.144 |      |    |       |
| R9  | −10.251    | d9 =  | 1.313 | nd5  | 1.5444 | v5 | 55.23 |
| R10 | −0.936     | d10 = | 0.182 |      |    |       |
| R11 | 15.939     | d11 = | 0.577 | nd6  | 1.5385 | v6 | 56.11 |
| R12 | 0.943      | d12 = | 0.710 |      |    |       |
| R13 | ∞          | d13 = | 0.210 | ndg  | 1.5168 | vg | 64.17 |
| R14 | ∞          | d14 = | 0.477 |      |    |       |

In the table, meanings of various symbols will be described as follows.

S1: aperture;
R: curvature radius of an optical surface, or a central curvature radius of a lens;
R1: curvature radius of the object side surface of the first lens L1;
R2: curvature radius of the image side surface of the first lens L1;
R3: curvature radius of the object side surface of the second lens L2;
R4: curvature radius of the image side surface of the second lens L2;
R5: curvature radius of the object side surface of the third lens L3;
R6: curvature radius of the image side surface of the third lens L3;
R7: curvature radius of the object side surface of the fourth lens L4;
R8: curvature radius of the image side surface of the fourth lens L4;
R9: curvature radius of the object side surface of the fifth lens L5;
R10: curvature radius of the image side surface of the fifth lens L5;
R11: curvature radius of the object side surface of the sixth lens L6;
R12: curvature radius of the image side surface of the sixth lens L6;
R13: curvature radius of an object side surface of the optical filter GF;
R14: curvature radius of an image side surface of the optical filter GF;
d: on-axis thickness of a lens and an on-axis distance between lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the sixth lens L6;
d11: on-axis thickness of the sixth lens L6;
d12: on-axis distance from the image side surface of the sixth lens L6 to the object side surface of the optical filter GF;
d13: on-axis thickness of the optical filter GF;
d14: on-axis distance from the image side surface of the optical filter GF to the image plane;
nd: refractive index of d line;
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
nd6: refractive index of d line of the sixth lens L6;
ndg: refractive index of d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
vg: abbe number of the optical filter GF.

Table 2 shows aspheric surface data of respective lens in the camera optical lens 10 according to Embodiment 1 of the present disclosure.

TABLE 2

| | Conic coefficient | Aspherical surface coefficients | | | |
|---|---|---|---|---|---|
| | k | A4 | A6 | A8 | A10 |
| R1 | 8.8632E+01 | 1.0143E-01 | -4.8394E-02 | 5.5648E-02 | -5.3165E-02 |
| R2 | -1.6625E+02 | 1.0692E-01 | 5.7065E-02 | -2.4528E-01 | 5.1389E-01 |
| R3 | -1.4265E+00 | 6.7290E-02 | -2.4905E-01 | 1.0595E+00 | -2.7213E+00 |
| R4 | 9.9000E+01 | 3.1763E-03 | -1.8755E-01 | 1.0285E+00 | -3.2509E+00 |
| R5 | 5.4060E+01 | -3.1603E-02 | 1.6008E-01 | -9.3719E-01 | 2.3350E+00 |
| R6 | 3.1889E+00 | 7.6102E-02 | -4.9868E-01 | 4.0311E-01 | 6.2529E-02 |
| R7 | 3.0666E+01 | -1.2814E-01 | 3.3772E-01 | -2.6598E+00 | 6.6785E+00 |
| R8 | -8.8540E+01 | -1.0289E-01 | 2.7691E-01 | -9.0678E-01 | 1.4257E+00 |
| R9 | 3.1176E+01 | -9.0721E-02 | 2.6140E-01 | -5.2954E-01 | 4.7007E-01 |
| R10 | -3.2972E+00 | -6.4964E-02 | -2.7145E-02 | 8.7745E-02 | -9.7667E-02 |
| R11 | -4.0058E+01 | -2.8455E-02 | -4.5141E-02 | 4.1655E-02 | -1.7726E-02 |
| R12 | -4.4183E+00 | -4.7365E-02 | 1.3171E-02 | -2.1766E-03 | 1.1851E-04 |

| | Aspherical surface coefficients | | | | |
|---|---|---|---|---|---|
| | A12 | A14 | A16 | A18 | A20 |
| R1 | 3.4520E-02 | -1.4233E-02 | 3.5874E-03 | -5.0896E-04 | 3.0870E-05 |
| R2 | -6.4776E-01 | 5.1417E-01 | -2.4920E-01 | 6.7586E-02 | -7.8919E-03 |
| R3 | 4.4265E+00 | -4.5705E+00 | 2.8925E+00 | -1.0184E+00 | 1.5101E-01 |
| R4 | 6.2038E+00 | -7.3051E+00 | 5.1803E+00 | -2.0269E+00 | 3.3487E-01 |
| R5 | -3.1690E+00 | 2.0888E+00 | -2.1297E-01 | -4.9945E-01 | 1.9908E-01 |
| R6 | 2.2556E-01 | -1.2071E+00 | 1.3909E+00 | -6.7898E-01 | 1.2549E-01 |
| R7 | -8.6944E+00 | 6.4774E+00 | -2.7508E+00 | 6.1532E-01 | -5.6168E-02 |
| R8 | -1.3174E+00 | 7.6081E-01 | -2.6795E-01 | 5.2356E-02 | -4.3328E-03 |
| R9 | -1.8902E-01 | 2.4444E-02 | 5.9691E-03 | -2.2670E-03 | 2.0689E-04 |
| R10 | 5.9825E-02 | -2.0324E-02 | 3.8441E-03 | -3.8107E-04 | 1.5478E-05 |
| R11 | 4.4041E-03 | -6.6158E-04 | 5.8991E-05 | -2.8707E-06 | 5.8635E-08 |
| R12 | 2.1573E-05 | -4.9368E-06 | 4.3344E-07 | -1.8387E-08 | 3.0755E-10 |

In Table 2, k is a conic coefficient, and A4, A6, A8, A10, A12, A14, A16, A18 and A20 are aspheric surface coefficients.

IH: image height $$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20} \quad (1)$$

In the present embodiment, an aspheric surface of each lens surface uses the aspheric surfaces represented by the above condition (1). However, the present disclosure is not limited to the aspherical polynomial form represented by the condition (1).

Table 3 and Table 4 show design data of inflexion points and arrest points of respective lens in the camera optical lens 10 according to Embodiment 1 of the present disclosure. P1R1 and P1R2 represent the object side surface and the image side surface of the first lens L1, respectively; P2R1 and P2R2 represent the object side surface and the image side surface of the second lens L2, respectively; P3R1 and P3R2 represent the object side surface and the image side surface of the third lens L3, respectively; P4R1 and P4R2 represent the object side surface and the image side surface of the fourth lens L4, respectively; P5R1 and P5R2 represent the object side surface and the image side surface of the fifth lens L5, respectively, and P6R1 and P6R2 represent the object side surface and the image side surface of the sixth lens L6, respectively. The data in the column "inflexion point position" indicates vertical distances from inflexion points arranged on each lens surface to the optic axis of the camera optical lens 10. The data in the column "arrest point position" indicates vertical distances from arrest points arranged on each lens surface to the optic axis of the camera optical lens 10.

TABLE 3

| | Number of inflexion points | Inflexion point position 1 | Inflexion point position 2 | Inflexion point position 3 |
|---|---|---|---|---|
| P1R1 | 2 | 0.235 | 1.625 | |
| P1R2 | 1 | 1.395 | | |
| P2R1 | 1 | 1.055 | | |
| P2R2 | 2 | 0.045 | 0.075 | |
| P3R1 | 1 | 1.125 | | |
| P3R2 | 1 | 1.195 | | |
| P4R1 | 2 | 1.115 | 1.195 | |
| P4R2 | 2 | 0.375 | 1.195 | |
| P5R1 | 2 | 1.095 | 1.575 | |
| P5R2 | 2 | 1.265 | 1.905 | |
| P6R1 | 3 | 0.365 | 1.915 | 2.785 |
| P6R2 | 1 | 0.725 | | |

TABLE 4

| | Number of arrest points | Arrest point position 1 | Arrest point position 2 |
|---|---|---|---|
| P1R1 | 1 | 0.405 | |
| P1R2 | 0 | | |
| P2R1 | 0 | | |
| P2R2 | 0 | | |
| P3R1 | 0 | | |
| P3R2 | 0 | | |
| P4R1 | 0 | | |
| P4R2 | 2 | 0.615 | 1.495 |
| P5R1 | 0 | | |
| P5R2 | 0 | | |
| P6R1 | 1 | 0.595 | |
| P6R2 | 1 | 2.155 | |

Figure 2:
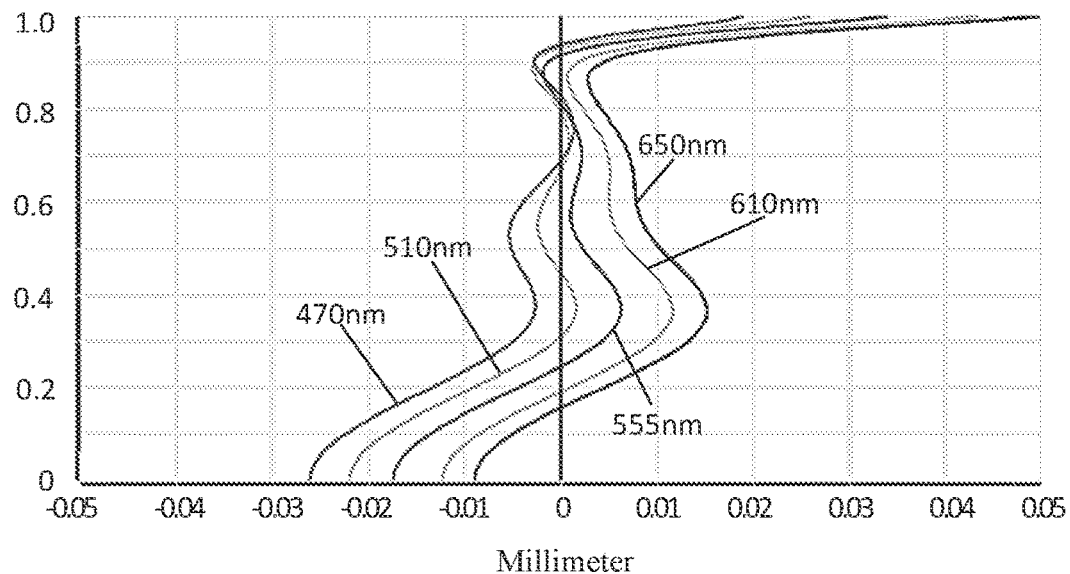
FIG. 2 is a schematic diagram of a longitudinal aberration of the camera optical lens shown in FIG. 1.
Figure 3:
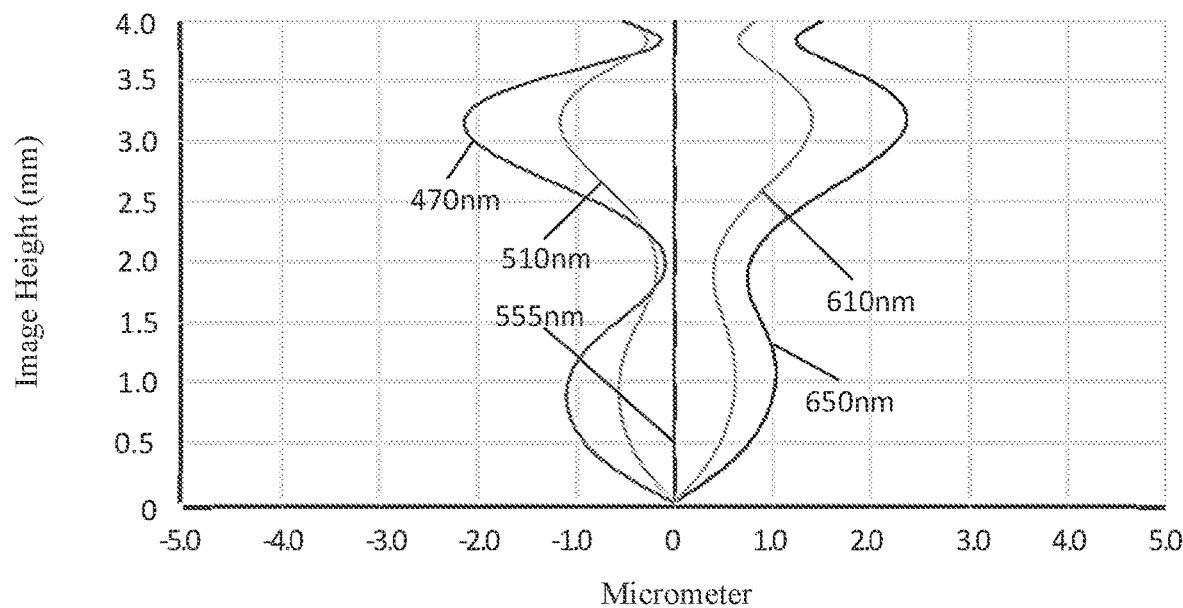
FIG. 3 is a schematic diagram of a lateral color of the camera optical lens shown in FIG. 1.
Figure 4:
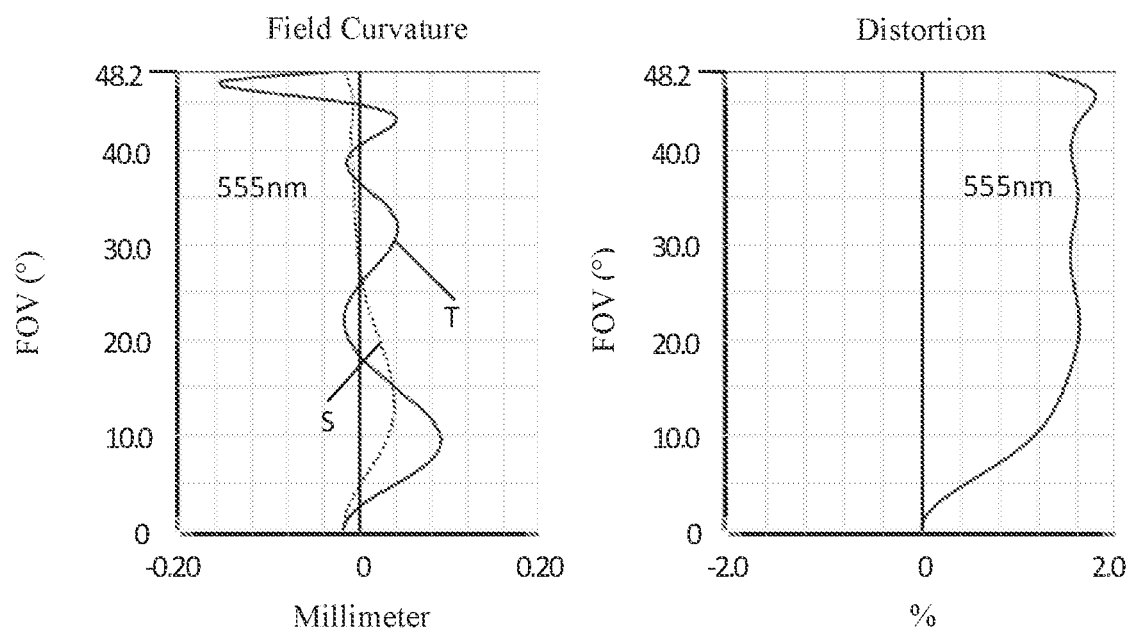
FIG. 4 is a schematic diagram of a field curvature and a distortion of the camera optical lens shown in FIG. 1.
Figure 5:
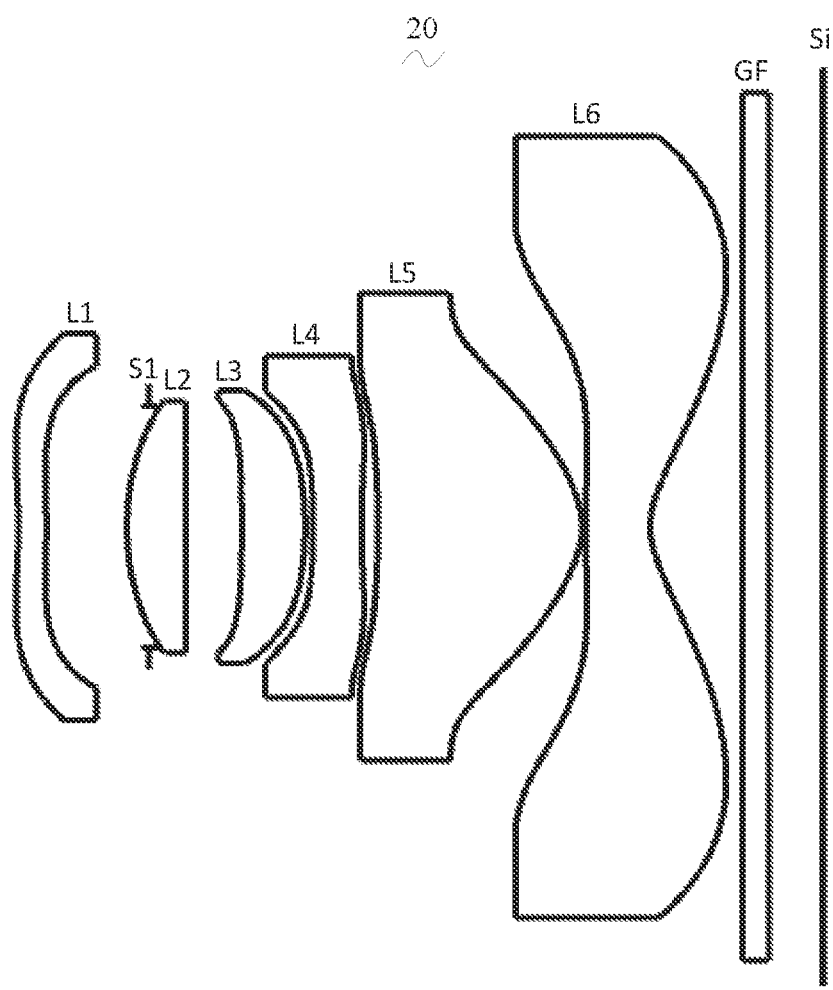
FIG. 5 is a structural schematic diagram of a camera optical lens according to Embodiment 2 of the present disclosure.

FIG. 2 and FIG. 3 illustrate a longitudinal aberration and a lateral color of light with wavelengths of 470 nm, 510 nm, 555 nm, 650 nm and 610 nm after passing the camera optical lens 10 according to Embodiment 1. FIG. 4 illustrates a field curvature and a distortion of light with a wavelength of 555 nm after passing the camera optical lens 10 according to Embodiment 1. In FIG. 4, a field curvature S is a field curvature in a sagittal direction and T is a field curvature in a tangential direction.

Table 21 below further lists various values of Embodiment 1, Embodiment 2, Embodiment 3, Embodiment 4, and Embodiment 5, as well as parameters which are specified in the above conditions.

As shown in Table 21, the camera optical lens according to Embodiment 1 satisfies the respective conditions.

In the present embodiment, the entrance pupil diameter of the camera optical lens is 2.019 mm. The image height is 4.00 mm. The FOV (field of view) along a diagonal direction is 96.40°. Thus, the camera optical lens 10 is an ultra-thin, large-aperture, wide-angle lens in which the on-axis and off-axis aberrations are sufficiently corrected, thereby leading to better optical characteristics.

Embodiment 2

Embodiment 2 is basically the same as Embodiment 1 and involves symbols having the same meanings as Embodiment 1. Only differences therebetween will be described in the following.

The image side surface of the first lens L1 is convex in the paraxial region. The image side surface of the second lens L2 is concave in the paraxial region.

Table 5 and Table 6 show design data of a camera optical lens 20 in Embodiment 2 of the present disclosure.

TABLE 5

|     | R       | d        |     | nd     |     | vd    |
|-----|---------|----------|-----|--------|-----|-------|
| S1  | ∞       | d0 = −1.073 |     |        |     |       |
| R1  | −5.661  | d1 = 0.230  | nd1 | 1.5444 | v1  | 55.82 |
| R2  | −8.199  | d2 = 0.660  |     |        |     |       |
| R3  | 2.446   | d3 = 0.478  | nd2 | 1.5444 | v2  | 55.82 |
| R4  | 32.411  | d4 = 0.464  |     |        |     |       |
| R5  | −12.420 | d5 = 0.517  | nd3 | 1.5444 | v3  | 55.82 |
| R6  | −3.242  | d6 = 0.063  |     |        |     |       |
| R7  | −10.381 | d7 = 0.399  | nd4 | 1.6610 | v4  | 20.53 |
| R8  | 5.943   | d8 = 0.133  |     |        |     |       |
| R9  | −14.969 | d9 = 1.671  | nd5 | 1.5444 | v5  | 55.23 |
| R10 | −0.749  | d10 = 0.033 |     |        |     |       |
| R11 | 9.294   | d11 = 0.526 | nd6 | 1.5385 | v6  | 56.11 |
| R12 | 0.666   | d12 = 0.760 |     |        |     |       |
| R13 | ∞       | d13 = 0.210 | ndg | 1.5168 | vg  | 64.17 |
| R14 | ∞       | d14 = 0.454 |     |        |     |       |

Table 6 shows aspheric surface data of respective lenses in the camera optical lens 20 according to Embodiment 2 of the present disclosure.

TABLE 6

| | Conic coefficient | Aspherical surface coefficients | | | |
|---|---|---|---|---|---|
| | k | A4 | A6 | A8 | A10 |
| R1 | −3.2079E+01 | 9.5206E−02 | −3.2156E−02 | 1.8834E−02 | −7.2032E−03 |
| R2 | −7.9579E+01 | 1.2956E−01 | −6.2448E−02 | 1.0776E−01 | −1.5792E−01 |
| R3 | −1.4459E+00 | 3.8152E−02 | −1.4701E−02 | 2.5990E−02 | 5.7083E−02 |
| R4 | 9.9000E+01 | −1.3164E−02 | 3.0408E−03 | −3.7601E−02 | 1.2748E−01 |
| R5 | 7.5419E+01 | −2.4112E−02 | 1.9872E−02 | −3.3039E−01 | 9.5295E−01 |
| R6 | 3.1781E+00 | −1.2923E−02 | −1.0027E−01 | −5.2127E−01 | 1.7213E+00 |
| R7 | 3.1855E+01 | −1.1266E−01 | 1.0938E−01 | −1.1319E+00 | 2.5931E+00 |
| R8 | −2.8273E+01 | −1.3205E−01 | 3.1879E−01 | −7.6168E−01 | 1.0219E+00 |
| R9 | −2.1983E+01 | −1.0739E−01 | 2.3689E−01 | −3.3166E−01 | 2.0695E−01 |
| R10 | −4.1867E+00 | −1.4985E−01 | 1.5898E−01 | −1.5483E−01 | 1.1015E−01 |
| R11 | −9.2543E+01 | −5.4612E−02 | 1.9160E−02 | −1.8087E−02 | 1.1816E−02 |
| R12 | −4.6332E+00 | −3.2794E−02 | 8.1891E−03 | −2.1642E−03 | 5.4584E−04 |

| | Aspherical surface coefficients | | | | |
|---|---|---|---|---|---|
| | A12 | A14 | A16 | A18 | A20 |
| R1 | 9.5447E−04 | 5.4723E−04 | −2.5407E−04 | 3.2453E−05 | −6.7245E−07 |
| R2 | 1.7707E−01 | −1.3327E−01 | 6.3782E−02 | −1.7330E−02 | 2.0350E−03 |
| R3 | −3.2796E−01 | 6.2865E−01 | −6.1704E−01 | 3.1208E−01 | −6.4438E−02 |
| R4 | −2.5616E−01 | 3.2937E−01 | −2.6405E−01 | 1.2096E−01 | −2.3779E−02 |
| R5 | −1.4936E+00 | 1.2914E+00 | −5.6620E−01 | 6.8939E−02 | 1.6684E−02 |
| R6 | −2.2759E+00 | 1.5727E+00 | −5.5576E−01 | 7.1750E−02 | 3.7222E−03 |
| R7 | −2.9177E+00 | 1.7897E+00 | −5.6770E−01 | 7.2660E−02 | 0.0000E+00 |
| R8 | −8.4886E−01 | 4.5182E−01 | −1.4856E−01 | 2.7190E−02 | −2.0922E−03 |
| R9 | −2.9874E−02 | −2.6509E−02 | 1.4352E−02 | −2.8043E−03 | 2.0147E−04 |
| R10 | −5.4341E−02 | 1.8107E−02 | −3.7567E−03 | 4.2885E−04 | −2.0415E−05 |
| R11 | −4.3793E−03 | 9.5876E−04 | −1.2262E−04 | 8.4656E−06 | −2.4399E−07 |
| R12 | −1.0891E−04 | 1.4482E−05 | −1.1801E−06 | 5.3288E−08 | −1.0216E−09 |

Table 7 and Table 8 show design data of inflexion points and arrest points of respective lens in the camera optical lens 20 according to Embodiment 2 of the present disclosure.

TABLE 7

| | Number of inflexion points | Inflexion point position 1 | Inflexion point position 2 | Inflexion point position 3 |
|---|---|---|---|---|
| P1R1 | 1 | 0.385 | | |
| P1R2 | 1 | 0.275 | | |
| P2R1 | 1 | 1.135 | | |
| P2R2 | 2 | 0.435 | 0.975 | |
| P3R1 | 0 | | | |
| P3R2 | 0 | | | |
| P4R1 | 2 | 1.185 | 1.255 | |
| P4R2 | 2 | 0.415 | 1.205 | |
| P5R1 | 1 | 1.105 | | |
| P5R2 | 2 | 1.355 | 1.985 | |
| P6R1 | 3 | 0.385 | 1.975 | 2.565 |
| P6R2 | 1 | 0.685 | | |

TABLE 8

| | Number of arrest points | Arrest point position 1 | Arrest point position 2 |
|---|---|---|---|
| P1R1 | 1 | 0.685 | |
| P1R2 | 1 | 0.485 | |
| P2R1 | 0 | | |
| P2R2 | 2 | 0.735 | 1.065 |
| P3R1 | 0 | | |
| P3R2 | 0 | | |
| P4R1 | 0 | | |
| P4R2 | 2 | 0.705 | 1.455 |
| P5R1 | 1 | 1.515 | |
| P5R2 | 0 | | |
| P6R1 | 1 | 0.685 | |
| P6R2 | 1 | 2.215 | |

Figure 6:
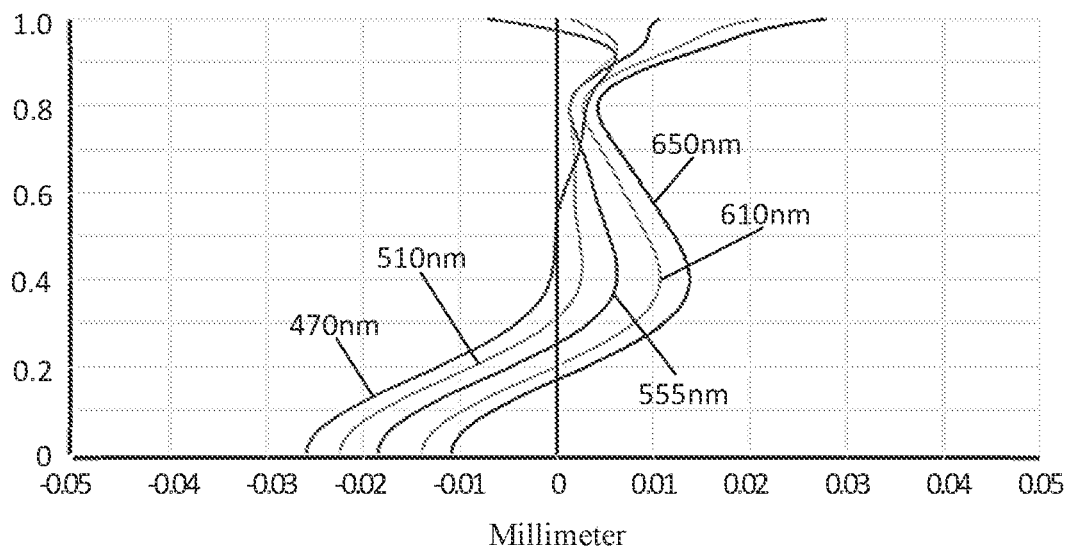
FIG. 6 is a schematic diagram of a longitudinal aberration of the camera optical lens shown in FIG. 5.
Figure 7:
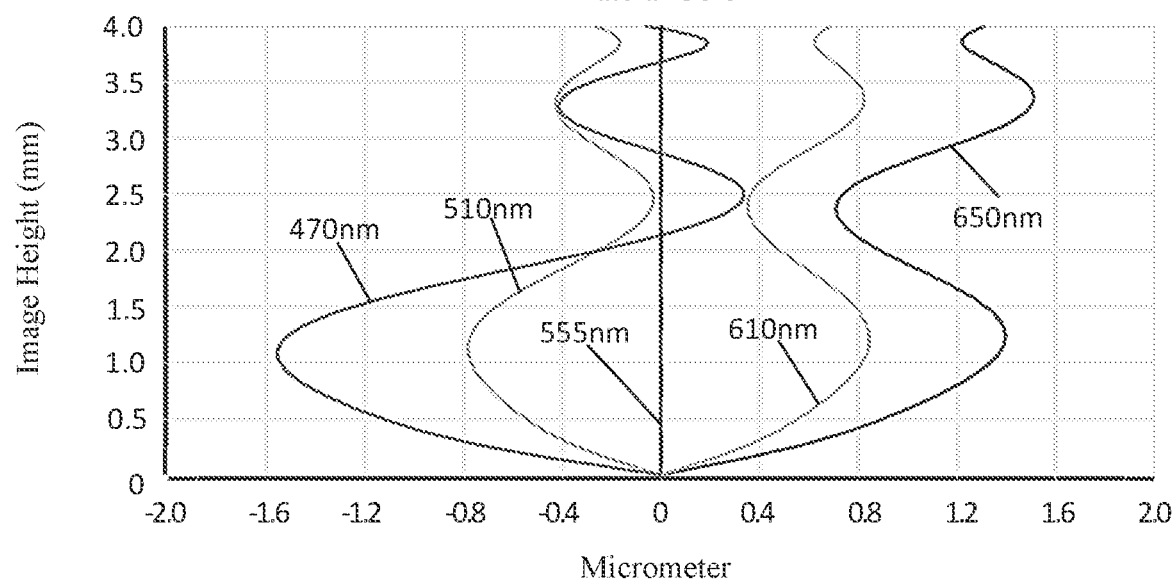
FIG. 7 is a schematic diagram of a lateral color of the camera optical lens shown in FIG. 5.
Figure 8:
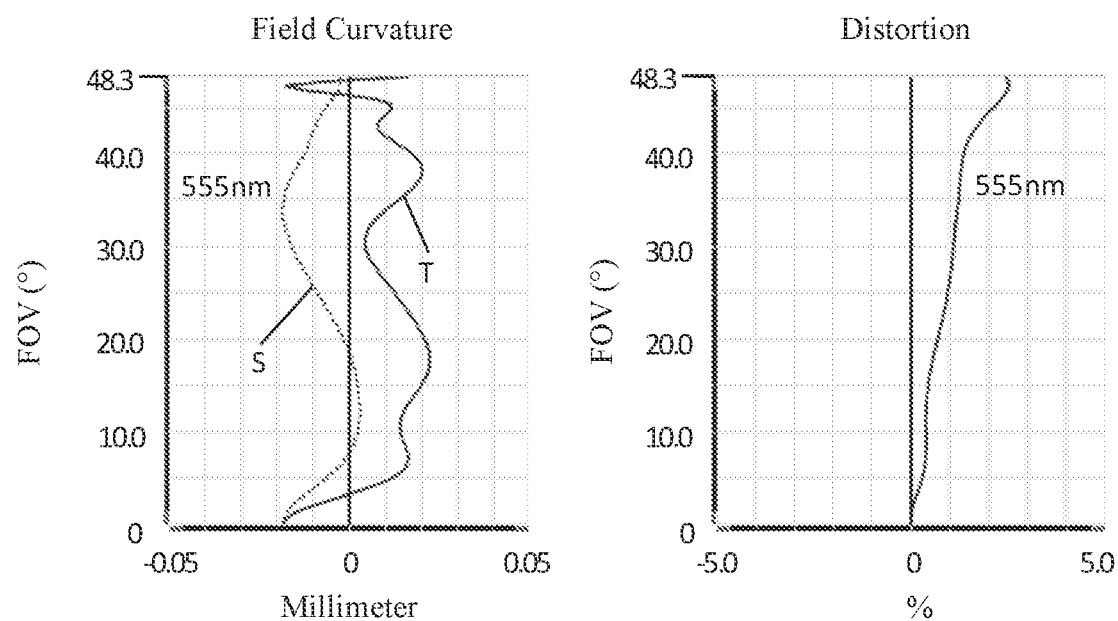
FIG. 8 is a schematic diagram of a field curvature and a distortion of the camera optical lens shown in FIG. 5.
Figure 9:
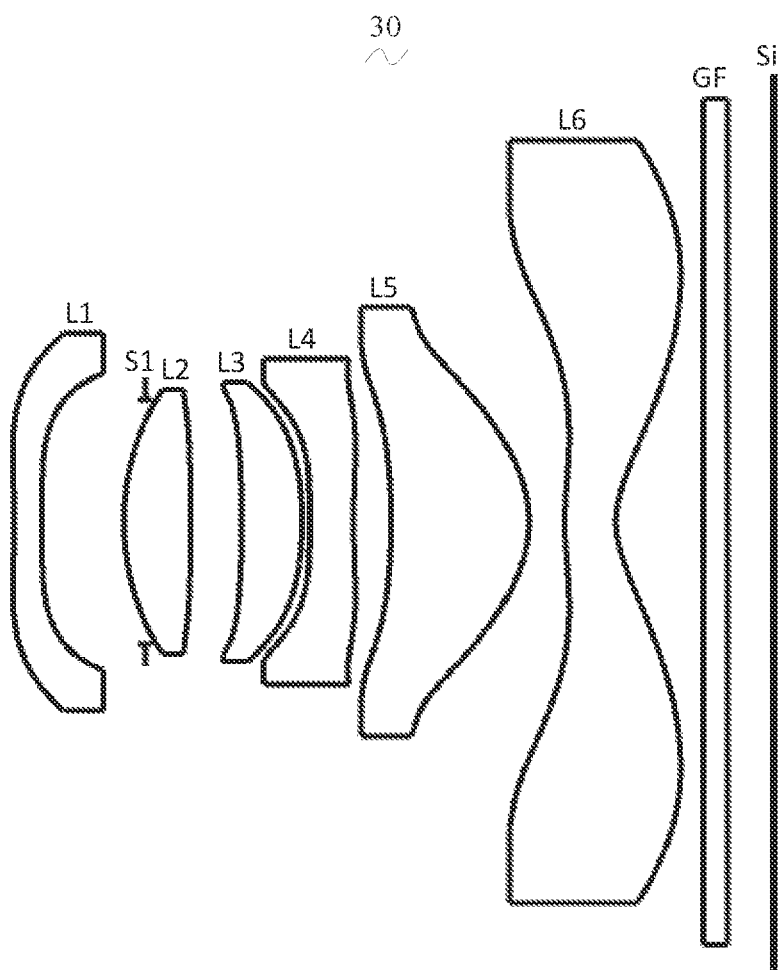
FIG. 9 is a structural schematic diagram of a camera optical lens according to Embodiment 3 of the present disclosure.

FIG. 6 and FIG. 7 illustrate a longitudinal aberration and a lateral color of light with wavelengths of 470 nm, 510 nm, 555 nm, 650 nm and 610 nm after passing the camera optical lens 20 according to Embodiment 2. FIG. 8 illustrates a field curvature and a distortion of light with a wavelength of 555 nm after passing the camera optical lens 20 according to Embodiment 2.

As shown in Table 21, the camera optical lens according to Embodiment 2 satisfies the respective conditions.

In the present embodiment, the entrance pupil diameter of the camera optical lens is 1.991 mm. The image height is 4.00 mm. The FOV along a diagonal direction is 96.60°. Thus, the camera optical lens 20 according to the Embodiment 2 is an ultra-thin, large-aperture, wide-angle lens in which the on-axis and off-axis aberrations are sufficiently corrected, thereby leading to better optical characteristics.

Embodiment 3

Embodiment 3 is basically the same as Embodiment 1 and involves symbols having the same meanings as Embodiment 1. Only differences therebetween will be described in the following.

The image side surface of the first lens L1 is convex in the paraxial region.

Table 9 and Table 10 show design data of a camera optical lens 30 in Embodiment 3 of the present disclosure.

TABLE 9

| | R | d | | nd | | vd | |
|---|---|---|---|---|---|---|---|
| S1 | ∞ | d0 = | −1.134 | | | | |
| R1 | −5.898 | d1 = | 0.244 | nd1 | 1.5444 | v1 | 55.82 |
| R2 | −26.943 | d2 = | 0.709 | | | | |
| R3 | 2.413 | d3 = | 0.581 | nd2 | 1.5444 | v2 | 55.82 |
| R4 | −37.621 | d4 = | 0.445 | | | | |
| R5 | −12.069 | d5 = | 0.528 | nd3 | 1.5444 | v3 | 55.82 |
| R6 | −2.962 | d6 = | 0.066 | | | | |
| R7 | −9.020 | d7 = | 0.379 | nd4 | 1.6610 | v4 | 20.53 |
| R8 | 8.984 | d8 = | 0.327 | | | | |
| R9 | −5.780 | d9 = | 1.197 | nd5 | 1.5444 | v5 | 55.23 |
| R10 | −1.155 | d10 = | 0.311 | | | | |
| R11 | 2.566 | d11 = | 0.447 | nd6 | 1.5385 | v6 | 56.11 |
| R12 | 0.827 | d12 = | 0.760 | | | | |
| R13 | ∞ | d13 = | 0.210 | ndg | 1.5168 | vg | 64.17 |
| R14 | ∞ | d14 = | 0.395 | | | | |

Table 10 shows aspheric surface data of respective lenses in the camera optical lens 30 according to Embodiment 3 of the present disclosure.

TABLE 10

| | Conic coefficient | Aspherical surface coefficients | | | |
|---|---|---|---|---|---|
| | k | A4 | A6 | A8 | A10 |
| R1 | −8.7466E+01 | 9.1613E−02 | −1.5564E−02 | −4.3606E−03 | 9.7653E−03 |
| R2 | −3.3666E+01 | 1.7212E−01 | −8.3393E−02 | 1.5543E−01 | −2.8643E−01 |
| R3 | −1.6853E+00 | 2.9163E−02 | −3.0450E−02 | 1.1387E−01 | −2.7325E−01 |
| R4 | 9.9000E+01 | −2.4345E−02 | 4.0082E−03 | −3.6949E−02 | 9.5273E−02 |
| R5 | −1.9584E+00 | −7.7000E−03 | −9.9431E−03 | −1.5526E−01 | 6.0053E−01 |
| R6 | 1.5485E+00 | 7.6614E−02 | −5.2601E−01 | 9.3859E−01 | −1.0506E+00 |
| R7 | 2.6048E+01 | −2.1679E−03 | −4.6256E−01 | 5.7131E−01 | −2.9629E−01 |
| R8 | 1.7507E+01 | −3.3907E−02 | −7.1441E−02 | 1.5148E−02 | 8.5513E−02 |
| R9 | −2.2453E+01 | −3.2826E−02 | 3.5904E−02 | −8.8968E−02 | 1.1839E−01 |
| R10 | −3.5907E+00 | −1.4656E−01 | 2.0415E−01 | −2.6228E−01 | 2.3284E−01 |
| R11 | −6.2788E+01 | −1.0120E−01 | 6.3953E−02 | −3.6614E−02 | 1.5057E−02 |
| R12 | −4.4058E+00 | −5.6270E−02 | 2.5831E−02 | −9.3040E−03 | 2.3009E−03 |

| | Aspherical surface coefficients | | | | |
|---|---|---|---|---|---|
| | A12 | A14 | A16 | A18 | A20 |
| R1 | −6.0939E−03 | 1.9503E−03 | −2.4619E−04 | −1.6502E−05 | 4.6034E−06 |
| R2 | 3.9931E−01 | −3.5757E−01 | 1.9718E−01 | −6.0583E−02 | 8.0372E−03 |
| R3 | 4.1483E−01 | −3.9675E−01 | 2.3128E−01 | −7.4608E−02 | 1.0257E−02 |

TABLE 10-continued

| | | | | |
|---|---|---|---|---|
| R4 | −1.4124E−01 | 1.3070E−01 | −7.4320E−02 | 2.4345E−02 | −3.3656E−03 |
| R5 | −1.1618E+00 | 1.2974E+00 | −8.5223E−01 | 3.0146E−01 | −4.3556E−02 |
| R6 | 8.4826E−01 | −5.3176E−01 | 2.5063E−01 | −7.7435E−02 | 1.1457E−02 |
| R7 | −2.8648E−02 | 1.2426E−01 | −5.8936E−02 | 9.1916E−03 | 0.0000E+00 |
| R8 | −1.0979E−01 | 6.4138E−02 | −1.7779E−02 | 1.5467E−03 | 1.2188E−04 |
| R9 | −1.1380E−01 | 7.4006E−02 | −2.8099E−02 | 5.5444E−03 | −4.3998E−04 |
| R10 | −1.3643E−01 | 5.1137E−02 | −1.1543E−02 | 1.4150E−03 | −7.2156E−05 |
| R11 | −4.0519E−03 | 6.9446E−04 | −7.2762E−05 | 4.2402E−06 | −1.0527E−07 |
| R12 | −3.7800E−04 | 4.0183E−05 | −2.6497E−06 | 9.8591E−08 | −1.5851E−09 |

Table 11 and Table 12 show design data of inflexion points and arrest points of respective lens in the camera optical lens 30 according to Embodiment 3 of the present disclosure.

TABLE 11

| | Number of inflexion points | Inflexion point position 1 | Inflexion point position 2 | Inflexion point position 3 |
|---|---|---|---|---|
| P1R1 | 2 | 0.335 | 1.695 | |
| P1R2 | 1 | 0.145 | | |
| P2R1 | 0 | | | |
| P2R2 | 1 | 1.075 | | |
| P3R1 | 1 | 1.205 | | |
| P3R2 | 1 | 1.245 | | |
| P4R1 | 1 | 1.175 | | |
| P4R2 | 2 | 0.415 | 1.145 | |
| P5R1 | 1 | 1.215 | | |
| P5R2 | 2 | 1.375 | 1.855 | |
| P6R1 | 3 | 0.355 | 2.035 | 2.725 |
| P6R2 | 1 | 0.695 | | |

TABLE 12

| | Number of arrest points | Arrest point position 1 | Arrest point position 2 |
|---|---|---|---|
| P1R1 | 1 | 0.605 | |
| P1R2 | 1 | 0.235 | |
| P2R1 | 0 | | |
| P2R2 | 0 | | |
| P3R1 | 0 | | |
| P3R2 | 0 | | |
| P4R1 | 0 | | |
| P4R2 | 2 | 0.665 | 1.355 |
| P5R1 | 0 | | |
| P5R2 | 0 | | |
| P6R1 | 1 | 0.775 | |
| P6R2 | 1 | 2.225 | |

Figure 10:
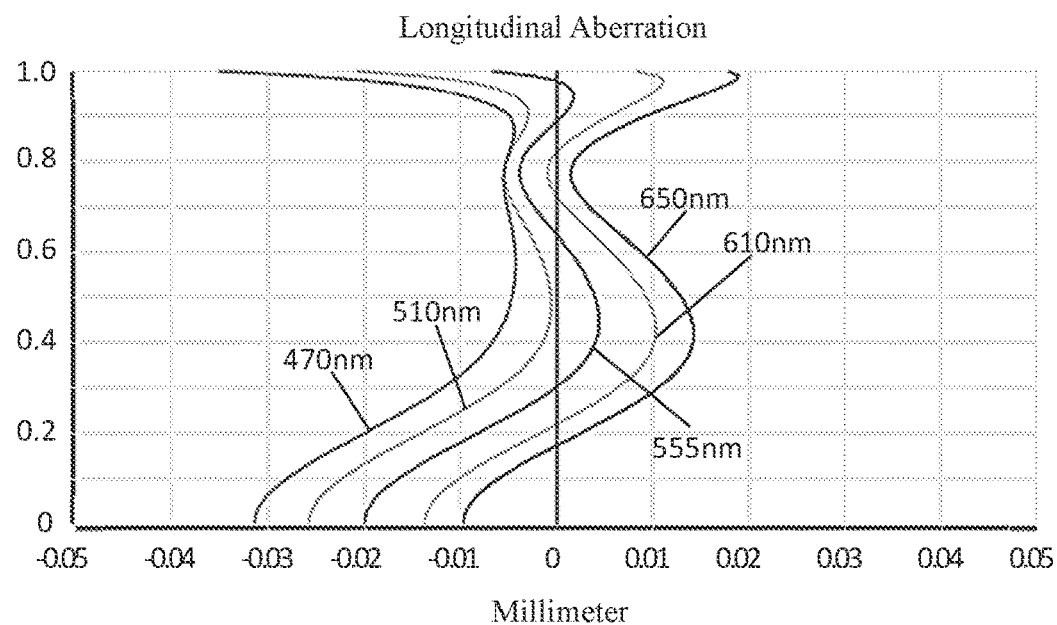
FIG. 10 is a schematic diagram of a longitudinal aberration of the camera optical lens shown in FIG. 9.
Figure 11:
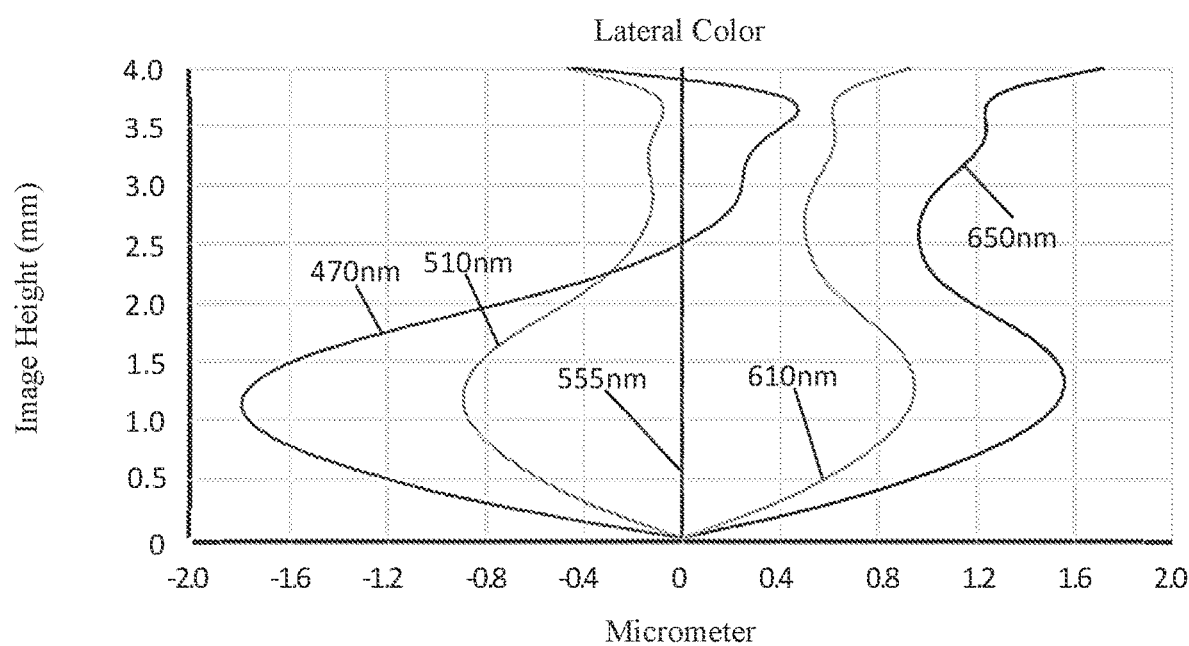
FIG. 11 is a schematic diagram of a lateral color of the camera optical lens shown in FIG. 9.
Figure 12:
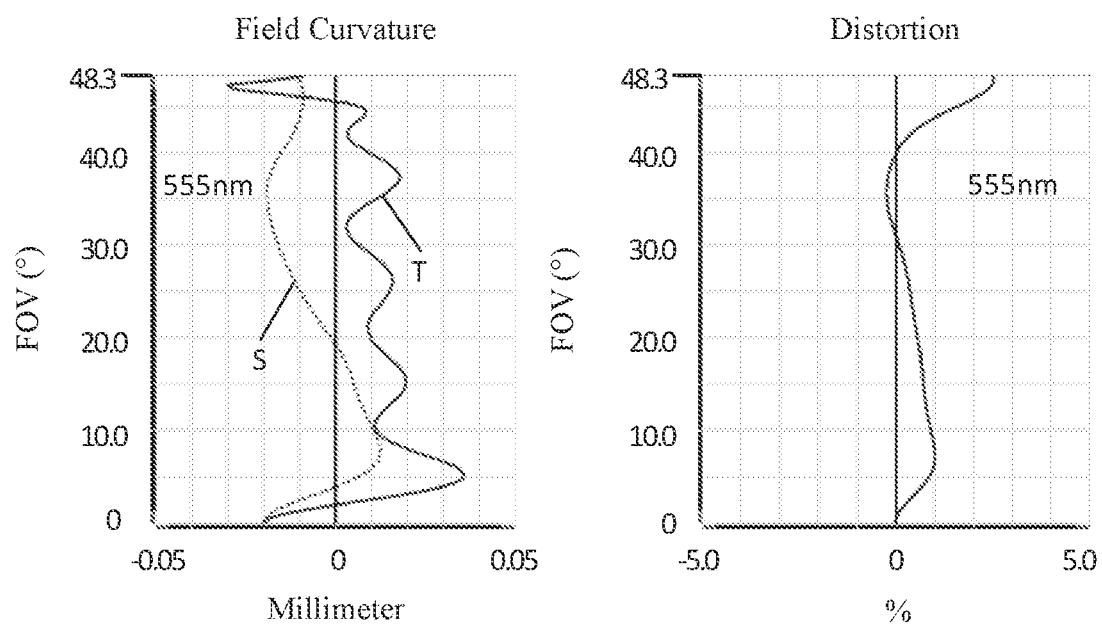
FIG. 12 is a schematic diagram of a field curvature and a distortion of the camera optical lens shown in FIG. 9.
Figure 13:
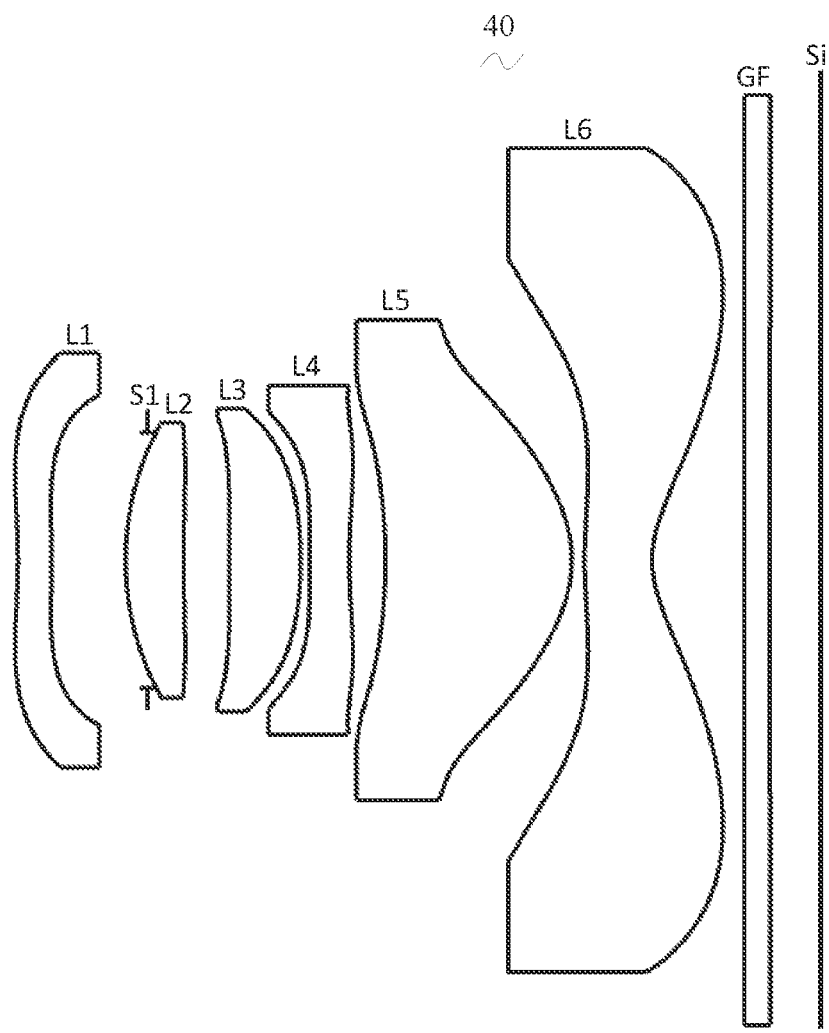
FIG. 13 is a structural schematic diagram of a camera optical lens according to Embodiment 4 of the present disclosure.

FIG. 10 and FIG. 11 illustrate a longitudinal aberration and a lateral color of light with wavelengths of 470 nm, 510 nm, 555 nm, 650 nm and 610 nm after passing the camera optical lens 30 according to Embodiment 3. FIG. 12 illustrates field curvature and distortion of light with a wavelength of 555 nm after passing the camera optical lens 30 according to Embodiment 3.

Table 21 below further lists various values of the present embodiment and v parameters which are specified in the above conditions. It is obvious that the camera optical lens according to the present embodiment satisfies the above conditions.

In the present embodiment, the entrance pupil diameter of the camera optical lens 30 is 1.990 mm. The image height is 4.00 mm. The FOV along a diagonal direction is 96.60°. Thus, the camera optical lens 30 according to the Embodiment 3 is an ultra-thin, large-aperture, wide-angle lens in which the on-axis and off-axis aberrations are sufficiently corrected, thereby leading to better optical characteristics.

Embodiment 4

Embodiment 4 is basically the same as Embodiment 1 and involves symbols having the same meanings as Embodiment 1. Only differences therebetween will be described in the following.

The image side surface of the first lens L1 is convex in the paraxial region. The image side surface of the second lens L2 is concave in a paraxial region.

Table 13 and Table 14 show design data of a camera optical lens 40 in Embodiment 4 of the present disclosure.

TABLE 13

| | R | d | | nd | | vd |
|---|---|---|---|---|---|---|
| S1 | ∞ | d0 = | −1.069 | | | |
| R1 | −5.347 | d1 = | 0.279 | nd1 | 1.5444 | v1 | 55.82 |
| R2 | −9.474 | d2 = | 0.608 | | | |
| R3 | 2.415 | d3 = | 0.478 | nd2 | 1.5444 | v2 | 55.82 |
| R4 | 15.074 | d4 = | 0.376 | | | |
| R5 | −92.261 | d5 = | 0.586 | nd3 | 1.5444 | v3 | 55.82 |
| R6 | −3.196 | d6 = | 0.073 | | | |
| R7 | −1030.30 | d7 = | 0.327 | nd4 | 1.6610 | v4 | 20.53 |
| R8 | 5.177 | d8 = | 0.295 | | | |
| R9 | −5.018 | d9 = | 1.535 | nd5 | 1.5444 | v5 | 55.23 |
| R10 | −1.000 | d10 = | 0.103 | | | |
| R11 | 3.429 | d11 = | 0.554 | nd6 | 1.5385 | v6 | 56.11 |
| R12 | 0.788 | d12 = | 0.760 | | | |
| R13 | ∞ | d13 = | 0.210 | ndg | 1.5168 | vg | 64.17 |
| R14 | ∞ | d14 = | 0.414 | | | |

Table 14 shows aspheric surface data of respective lenses in the camera optical lens 40 according to Embodiment 4 of the present disclosure.

TABLE 14

| | Conic coefficient | Aspherical surface coefficients | | | |
|---|---|---|---|---|---|
| | k | A4 | A6 | A8 | A10 |
| R1 | −4.6975E+01 | 7.9050E−02 | −1.6367E−02 | 3.8563E−03 | 2.7635E−03 |
| R2 | 3.9165E+01 | 1.5306E−01 | −5.5643E−02 | 7.3401E−02 | −9.1097E−02 |
| R3 | −1.7367E+00 | 3.7172E−02 | −3.3955E−02 | 9.5735E−02 | −2.1840E−01 |
| R4 | −9.6836E+01 | −1.8398E−02 | −4.7328E−03 | −3.6798E−02 | 1.0221E−01 |

TABLE 14-continued

| | | | | |
|---|---|---|---|---|
| R5 | 9.9000E+01 | −1.9709E−02 | −5.5459E−03 | −1.0924E−01 | 3.6133E−01 |
| R6 | 2.2232E+00 | −8.6469E−02 | 7.6194E−02 | −1.3264E−01 | 5.4521E−02 |
| R7 | 9.8996E+01 | −1.8506E−01 | 1.0372E−01 | −2.0613E−01 | 1.9668E−01 |
| R8 | 7.4779E+00 | −1.0790E−01 | 4.5351E−02 | −4.1410E−02 | 1.7766E−03 |
| R9 | −3.1164E+01 | −4.5205E−02 | 7.1549E−03 | 2.4448E−03 | 1.4043E−02 |
| R10 | −3.5096E+00 | −1.1164E−01 | 1.3377E−01 | −1.7414E−01 | 1.5630E−01 |
| R11 | −9.0000E+01 | −5.8993E−02 | −4.3458E−03 | 1.8954E−02 | −1.3238E−02 |
| R12 | −4.1634E+00 | −6.0404E−02 | 2.8332E−02 | −1.0300E−02 | 2.6099E−03 |

| Aspherical surface coefficients | | | | |
|---|---|---|---|---|
| A12 | A14 | A16 | A18 | A20 |
| R1 | −4.4525E−03 | 3.0929E−03 | −1.1869E−03 | 2.4691E−04 | −2.2041E−05 |
| R2 | 9.8586E−02 | −7.4361E−02 | 3.7570E−02 | −1.1267E−02 | 1.5718E−03 |
| R3 | 3.0009E−01 | −2.4082E−01 | 1.0206E−01 | −1.6946E−02 | −1.9666E−04 |
| R4 | −1.5837E−01 | 1.4128E−01 | −6.1433E−02 | 4.5189E−03 | 4.1025E−03 |
| R5 | −6.8518E−01 | 7.8057E−01 | −5.2706E−01 | 1.9243E−01 | −2.8620E−02 |
| R6 | 1.6537E−01 | −3.0201E−01 | 2.2863E−01 | −8.6565E−02 | 1.3526E−02 |
| R7 | −6.3696E−02 | −3.3873E−02 | 3.4774E−02 | −8.0735E−03 | 0.0000E+00 |
| R8 | 4.8637E−02 | −5.9137E−02 | 3.5684E−02 | −1.1177E−02 | 1.4353E−03 |
| R9 | −4.3359E−02 | 4.5905E−02 | −2.2107E−02 | 4.9661E−03 | −4.2058E−04 |
| R10 | −9.0367E−02 | 3.2961E−02 | −7.1932E−03 | 8.5010E−04 | −4.1737E−05 |
| R11 | 5.1550E−03 | −1.2163E−03 | 1.7184E−04 | −1.3324E−05 | 4.3417E−07 |
| R12 | −4.5180E−04 | 5.1955E−05 | −3.7865E−06 | 1.5802E−07 | −2.8732E−09 |

Table 15 and Table 16 show design data of inflexion points and arrest points of respective lens in the camera optical lens 40 according to Embodiment 4 of the present disclosure.

TABLE 15

| | Number of inflexion points | Inflexion point position 1 | Inflexion point position 2 | Inflexion point position 3 |
|---|---|---|---|---|
| P1R1 | 1 | 0.395 | | |
| P1R2 | 1 | 0.255 | | |
| P2R1 | 0 | | | |
| P2R2 | 2 | 0.455 | 1.035 | |
| P3R1 | 1 | 1.145 | | |
| P3R2 | 0 | | | |
| P4R1 | 0 | | | |
| P4R2 | 2 | 0.445 | 1.165 | |
| P5R1 | 1 | 1.145 | | |
| P5R2 | 2 | 1.405 | 1.905 | |
| P6R1 | 3 | 0.375 | 2.105 | 2.355 |
| P6R2 | 1 | 0.695 | | |

TABLE 16

| | Number of arrest points | Arrest point position 1 | Arrest point position 2 |
|---|---|---|---|
| P1R1 | 1 | 0.705 | |
| P1R2 | 1 | 0.445 | |
| P2R1 | 0 | | |
| P2R2 | 2 | 0.745 | 1.125 |
| P3R1 | 0 | | |
| P3R2 | 0 | | |
| P4R1 | 0 | | |
| P4R2 | 2 | 0.785 | 1.345 |
| P5R1 | 0 | | |
| P5R2 | 0 | | |
| P6R1 | 1 | 0.745 | |
| P6R2 | 1 | 2.185 | |

Figure 14:
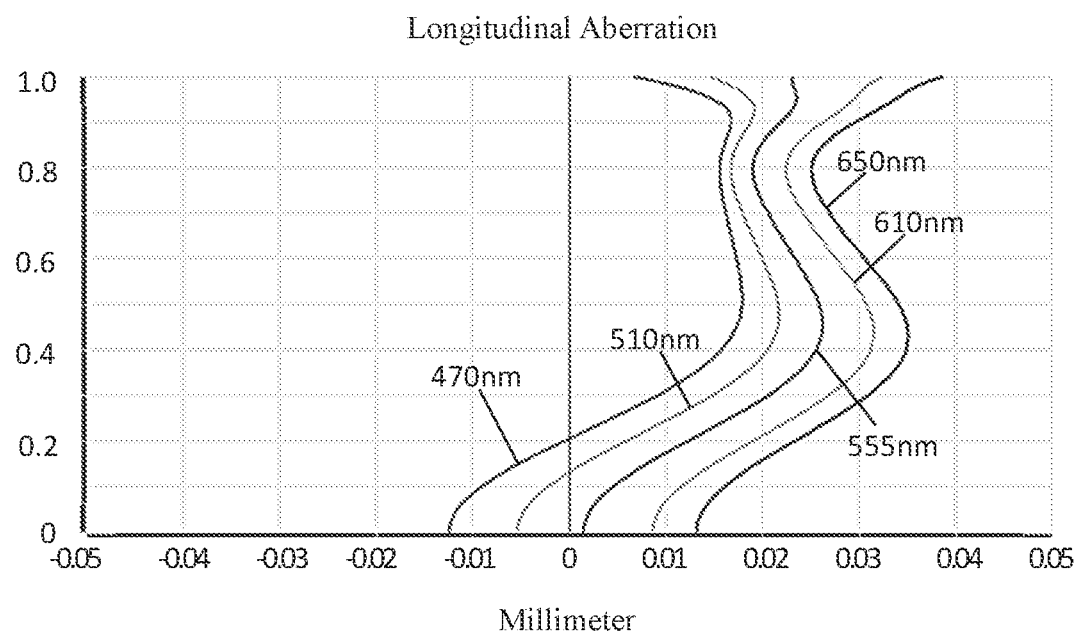
FIG. 14 is a schematic diagram of a longitudinal aberration of the camera optical lens shown in FIG. 13.
Figure 15:
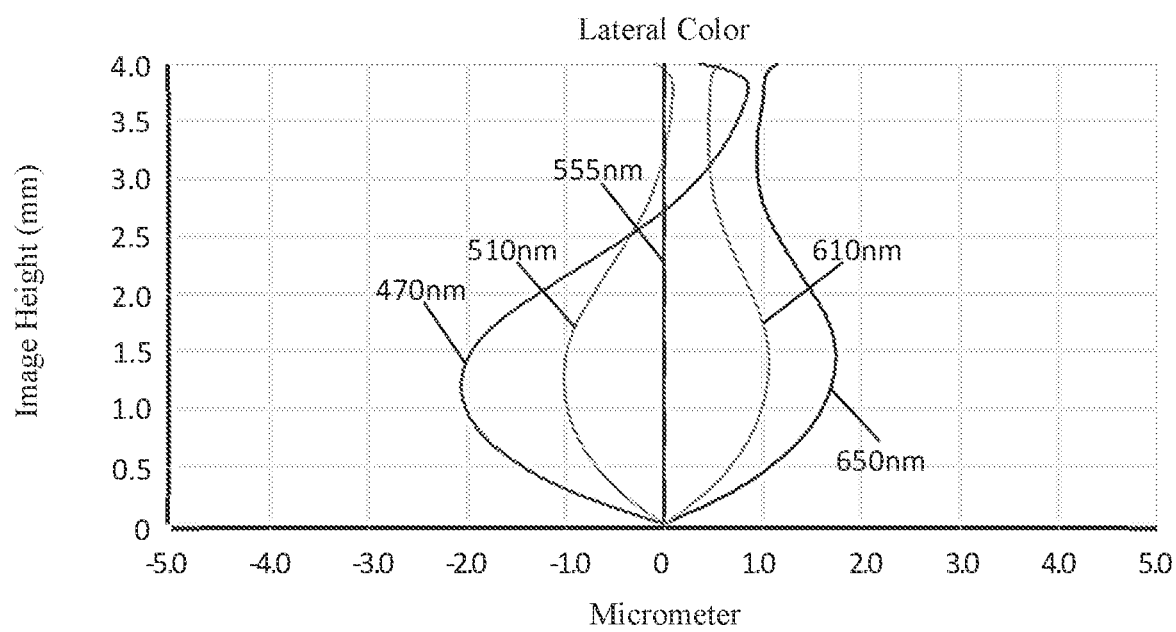
FIG. 15 is a schematic diagram of a lateral color of the camera optical lens shown in FIG. 13.
Figure 16:
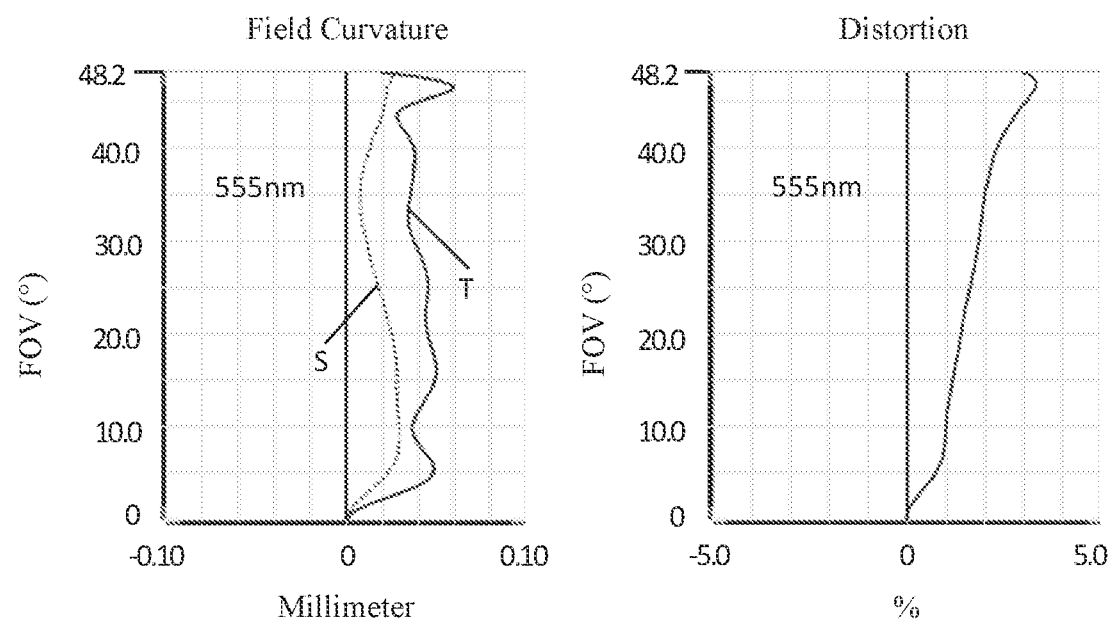
FIG. 16 is a schematic diagram of a field curvature and a distortion of the camera optical lens shown in FIG. 13.
Figure 17:
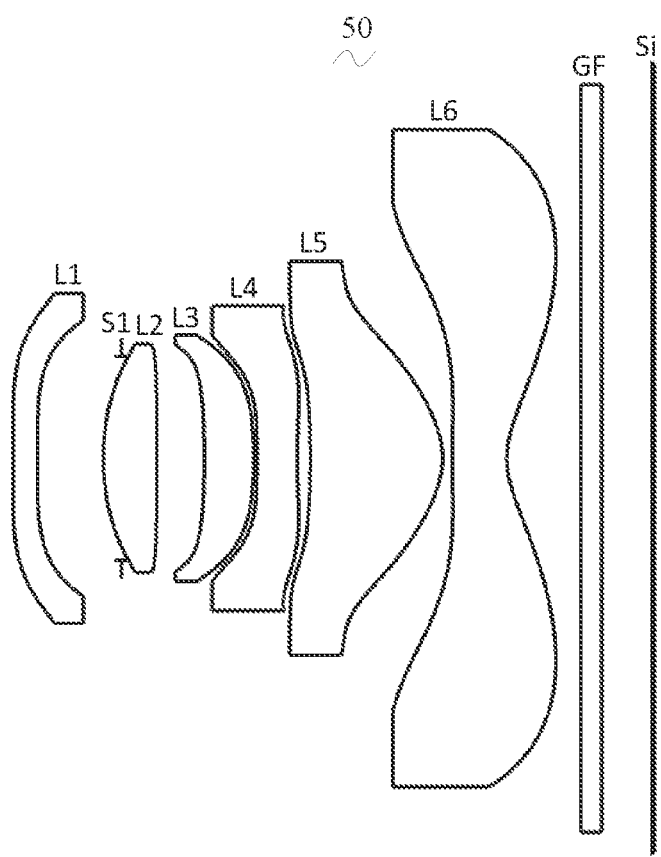
FIG. 17 is a structural schematic diagram of a camera optical lens according to Embodiment 5 of the present disclosure.

FIG. 14 and FIG. 15 illustrate a longitudinal aberration and a lateral color of light with wavelengths of 470 nm, 510 nm, 555 nm, 650 nm and 610 nm after passing the camera optical lens 40 according to Embodiment 4. FIG. 16 illustrates field curvature and distortion of light with a wavelength of 555 nm after passing the camera optical lens 40 according to Embodiment 4.

Table 21 below further lists various values of the present embodiment and parameters which are specified in the above conditions. Obviously, the camera optical lens according to the present embodiment satisfies the above conditions.

In the present embodiment, the entrance pupil diameter of the camera optical lens 40 is 2.006 mm. The image height is 4.00 mm. The FOV (field of view) along a diagonal direction is 96.20°. Thus, the camera optical lens 40 according to Embodiment 4 is an ultra-thin, large-aperture, wide-angle lens in which on-axis and off-axis aberrations are sufficiently corrected, thereby leading to better optical characteristics.

Embodiment 5

Embodiment 5 is basically the same as Embodiment 1 and involves symbols having the same meanings as Embodiment 1. Only differences therebetween will be described in the following.

The image side surface of the second lens L2 is concave in the paraxial region.

Table 17 and Table 18 show design data of a camera optical lens 50 in Embodiment 5 of the present disclosure.

TABLE 17

| | R | d | nd | vd |
|---|---|---|---|---|
| S1 | ∞ | d0 = −1.103 | | |
| R1 | −19.685 | d1 = 0.247 | nd1 1.5444 | v1 55.82 |
| R2 | 733.848 | d2 = 0.674 | | |
| R3 | 2.531 | d3 = 0.543 | nd2 1.5444 | v2 55.82 |
| R4 | 3406.508 | d4 = 0.487 | | |
| R5 | −8.578 | d5 = 0.507 | nd3 1.5444 | v3 55.82 |
| R6 | −3.423 | d6 = 0.034 | | |
| R7 | −8.66 | d7 = 0.406 | nd4 1.6610 | v4 20.53 |
| R8 | 6.561 | d8 = 0.132 | | |
| R9 | −13.458 | d9 = 1.351 | nd5 1.5444 | v5 55.23 |
| R10 | −0.814 | d10 = 0.098 | | |
| R11 | 23.766 | d11 = 0.554 | nd6 1.5385 | v6 56.11 |
| R12 | 0.816 | d12 = 0.760 | | |
| R13 | ∞ | d13 = 0.210 | ndg 1.5168 | vg 64.17 |
| R14 | ∞ | d14 = 0.536 | | |

Table 18 shows aspheric surface data of respective lenses in the camera optical lens 50 according to Embodiment 5 of the present disclosure.

TABLE 18

| | Conic coefficient | Aspherical surface coefficients | | | |
|---|---|---|---|---|---|
| | k | A4 | A6 | A8 | A10 |
| R1  | 9.3128E+01  | 1.0005E−01  | −4.7676E−02 | 5.6032E−02  | −5.3284E−02 |
| R2  | −3.4281E+01 | 1.0667E−01  | 5.6082E−02  | −2.4470E−01 | 5.1399E−01  |
| R3  | −1.5120E+00 | 6.5424E−02  | −2.4550E−01 | 1.0575E+00  | −2.7183E+00 |
| R4  | −9.8951E+01 | 3.4465E−03  | −1.8553E−01 | 1.0296E+00  | −3.2507E+00 |
| R5  | 4.9915E+01  | −2.1281E−02 | 1.5651E−01  | −9.3109E−01 | 2.3396E+00  |
| R6  | 3.6930E+00  | 6.8675E−02  | −4.9310E−01 | 3.9661E−01  | 6.8028E−02  |
| R7  | 2.8985E+01  | −1.2781E−01 | 3.3895E−01  | −2.6593E+00 | 6.6779E+00  |
| R8  | −9.3959E+01 | −1.0109E−01 | 2.7689E−01  | −9.0668E−01 | 1.4258E+00  |
| R9  | 3.9636E+01  | −9.4292E−02 | 2.6146E−01  | −5.2962E−01 | 4.6998E−01  |
| R10 | −3.4433E+00 | −6.6012E−02 | −2.7055E−02 | 8.7652E−02  | −9.7677E−02 |
| R11 | −4.0610E+01 | −2.7624E−02 | −4.5355E−02 | 4.1646E−02  | −1.7726E−02 |
| R12 | −4.9299E+00 | −4.7451E−02 | 1.3148E−02  | −2.1748E−03 | 1.1847E−04  |

| | Aspherical surface coefficients | | | | |
|---|---|---|---|---|---|
| | A12 | A14 | A16 | A18 | A20 |
| R1  | 3.4497E−02  | −1.4233E−02 | 3.5910E−03  | −5.1146E−04 | 3.1023E−05  |
| R2  | −6.4813E−01 | 5.1384E−01  | −2.4852E−01 | 6.7167E−02  | −7.8121E−03 |
| R3  | 4.4251E+00  | −4.5703E+00 | 2.8925E+00  | −1.0183E+00 | 1.5119E−01  |
| R4  | 6.2038E+00  | −7.3050E+00 | 5.1807E+00  | −2.0266E+00 | 3.3454E−01  |
| R5  | −3.1738E+00 | 2.0883E+00  | −2.0881E−01 | −4.9690E−01 | 1.9584E−01  |
| R6  | 2.2629E−01  | −1.2085E+00 | 1.3908E+00  | −6.7850E−01 | 1.2535E−01  |
| R7  | −8.6949E+00 | 6.4781E+00  | −2.7504E+00 | 6.1488E−01  | −5.5994E−02 |
| R8  | −1.3174E+00 | 7.6081E−01  | −2.6796E−01 | 5.2361E−02  | −4.3344E−03 |
| R9  | −1.8904E−01 | 2.4449E−02  | 5.9724E−03  | −2.2660E−03 | 2.0604E−04  |
| R10 | 5.9827E−02  | −2.0324E−02 | 3.8442E−03  | −3.8108E−04 | 1.5476E−05  |
| R11 | 4.4041E−03  | −6.6158E−04 | 5.8990E−05  | −2.8708E−06 | 5.8632E−08  |
| R12 | 2.1551E−05  | −4.9383E−06 | 4.3336E−07  | −1.8395E−08 | 3.0611E−10  |

Table 19 and Table 20 show design data of inflexion points and arrest points of respective lens in the camera optical lens 50 according to Embodiment 5 of the present disclosure.

TABLE 19

| | Number of inflexion points | Inflexion point position 1 | Inflexion point position 2 | Inflexion point position 3 |
|---|---|---|---|---|
| P1R1 | 2 | 0.215 | 1.585 | |
| P1R2 | 1 | 1.385 | | |
| P2R1 | 1 | 1.075 | | |
| P2R2 | 1 | 0.115 | | |
| P3R1 | 1 | 1.135 | | |
| P3R2 | 1 | 1.195 | | |
| P4R1 | 2 | 1.095 | 1.235 | |
| P4R2 | 2 | 0.375 | 1.175 | |
| P5R1 | 2 | 1.095 | 1.545 | |
| P5R2 | 2 | 1.275 | 1.895 | |
| P6R1 | 3 | 0.315 | 1.955 | 2.565 |
| P6R2 | 1 | 0.665 | | |

TABLE 20

| | Number of arrest points | Arrest point position 1 | Arrest point position 2 |
|---|---|---|---|
| P1R1 | 1 | 0.375 | |
| P1R2 | 0 | | |
| P2R1 | 0 | | |
| P2R2 | 1 | 0.165 | |
| P3R1 | 0 | | |
| P3R2 | 0 | | |
| P4R1 | 0 | | |
| P4R2 | 2 | 0.615 | 1.475 |
| P5R1 | 0 | | |
| P5R2 | 0 | | |
| P6R1 | 1 | 0.505 | |
| P6R2 | 1 | 2.065 | |

Figure 18:
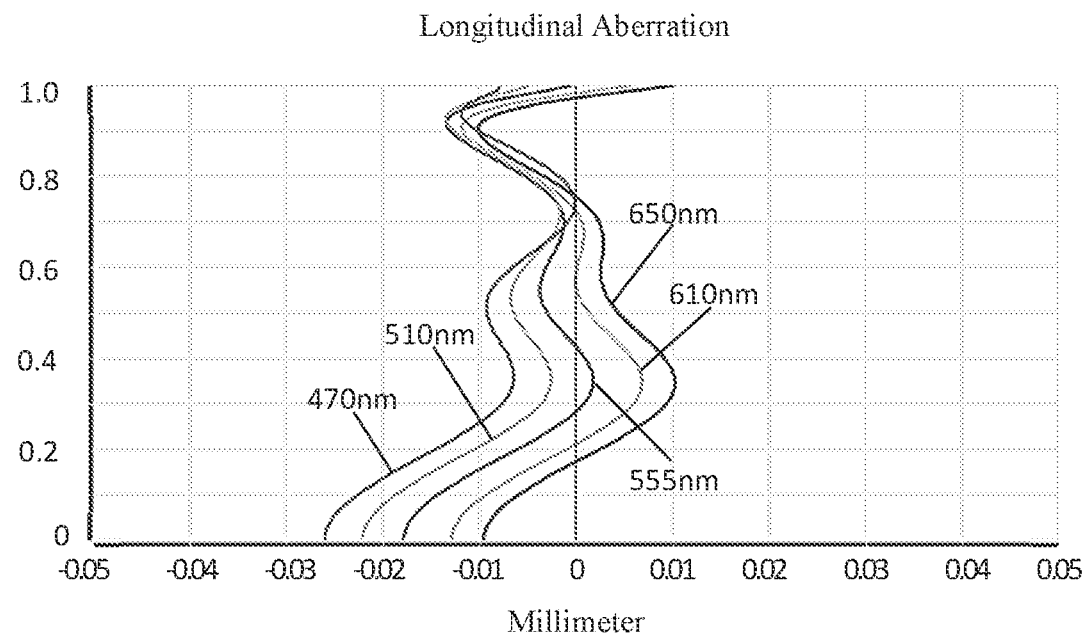
FIG. 18 is a schematic diagram of a longitudinal aberration of the camera optical lens shown in FIG. 17.
Figure 19:
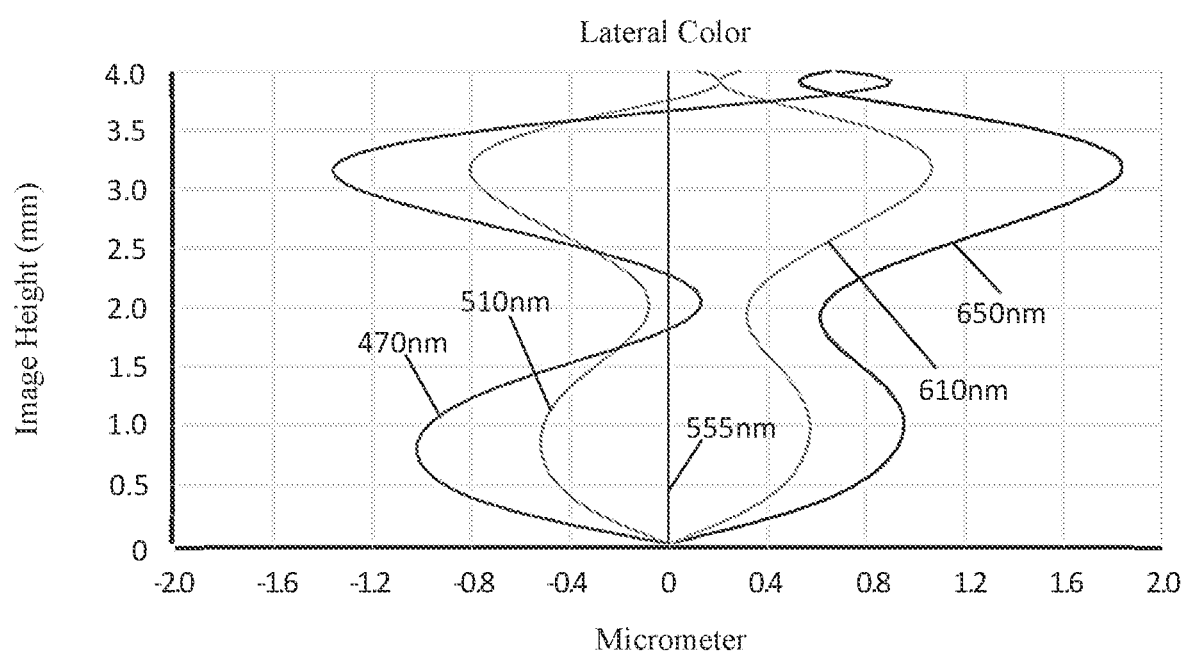
FIG. 19 is a schematic diagram of a lateral color of the camera optical lens shown in FIG. 17.
Figure 20:
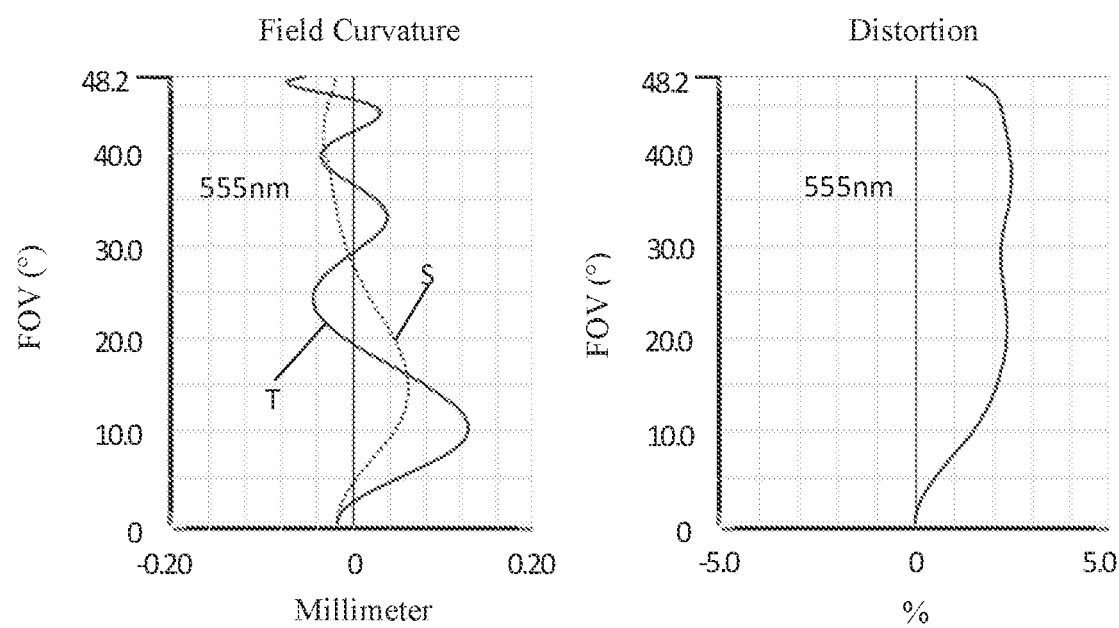
FIG. 20 is a schematic diagram of a field curvature and a distortion of the camera optical lens shown in FIG. 17.

FIG. 18 and FIG. 19 illustrate a longitudinal aberration and a lateral color of light with wavelengths of 470 nm, 510 nm, 555 nm, 650 nm and 610 nm after passing the camera optical lens 50 according to Embodiment 5. FIG. 20 illustrates field curvature and distortion of light with a wavelength of 555 nm after passing the camera optical lens 50 according to Embodiment 5.

Table 21 below further lists various values of the present embodiment and parameters which are specified in the above conditions. Obviously, the camera optical lens according to the present embodiment satisfies the above conditions.

In the present embodiment, the entrance pupil diameter of the camera optical lens is 2.017 mm. The image height is 4.00 mm. The FOV (field of view) along a diagonal direction is 96.40°. Thus, the camera optical lens 50 according to Embodiment 5 is an ultra-thin, large-aperture, wide-angle lens in which the on-axis and off-axis aberrations are sufficiently corrected, thereby leading to better optical characteristics.

TABLE 21

| Parameters and Conditions | Embodiment 1 | Embodiment 2 | Embodiment 3 | Embodiment 4 | Embodiment 5 |
|---|---|---|---|---|---|
| f | 3.513 | 3.464 | 3.462 | 3.491 | 3.510 |
| f1 | −23.508 | −34.590 | −13.883 | −23.024 | −35.096 |
| f2 | 4.405 | 4.817 | 4.174 | 5.197 | 4.638 |
| f3 | 9.149 | 7.875 | 7.042 | 6.047 | 10.080 |
| f4 | −5.658 | −5.613 | −6.694 | −7.725 | −5.539 |
| f5 | 1.797 | 1.386 | 2.421 | 2.024 | 1.528 |
| f6 | −1.881 | −1.356 | −2.482 | −2.043 | −1.578 |
| f12 | 5.203 | 5.392 | 5.444 | 6.364 | 5.202 |
| Fno | 1.74 | 1.74 | 1.74 | 1.74 | 1.74 |
| f1/f | −6.69 | −9.99 | −4.01 | −6.60 | −10.00 |
| f5/f | 0.51 | 0.40 | 0.70 | 0.58 | 0.44 |
| d5/d6 | 10.78 | 8.21 | 8.00 | 8.03 | 14.91 |

Those skilled in the art can understand that the above are merely some embodiments of the present disclosure. In practice, those skilled in the art can make various modifications to these embodiments in forms and details without departing from the spirit and scope of the present disclosure.

What is claimed is:

1. A camera optical lens, comprising, from an object side to an image side:
   a first lens having a negative refractive power;
   a second lens having a positive refractive power;
   a third lens having a positive refractive power;
   a fourth lens having a negative refractive power;
   a fifth lens having a positive refractive power; and
   a sixth lens having a negative refractive power,
   wherein the camera optical lens satisfies following conditions:

$-10.00 \leq f1/f \leq -4.00$;

$0.40 \leq f5/f \leq 0.70$;

$8.00 \leq d5/d6 \leq 15.00$; and $0.00 \leq (R7+R8)/(R7-R8) \leq 1.00$, where
   f denotes a focal length of the camera optical lens;
   f1 denotes a focal length of the first lens;
   f5 denotes a focal length of the fifth lens;
   d5 denotes an on-axis thickness of the third lens;
   d6 denotes an on-axis distance from an image side surface of the third lens to an object side surface of the fourth lens;
   R7 denotes a curvature radius of the object side surface of the fourth lens; and
   R8 denotes a curvature radius of an image side surface of the fourth lens.

2. The camera optical lens as described in claim 1, further satisfying a following condition:

$5.00 \leq R9/R10 \leq 20.00$, where
   R9 denotes a curvature radius of an object side surface of the fifth lens; and
   R10 denotes a curvature radius of an image side surface of the fifth lens.

3. The camera optical lens as described in claim 1, further satisfying following conditions:

$-10.92 \leq (R1+R2)/(R1-R2) \leq -0.33$; and $0.02 \leq d1/TTL \leq 0.06$, where
   R1 denotes a curvature radius of an object side surface of the first lens;
   R2 denotes a curvature radius of an image side surface of the first lens;
   d1 denotes an on-axis thickness of the first lens; and
   TTL denotes a total optical length from the object side surface of the first lens to an image plane of the camera optical lens along an optic axis.

4. The camera optical lens as described in claim 1, further satisfying following conditions:

$0.60 \leq f2/f2 \leq 23.23$;

$-2.76 \leq (R3+R4)/(R3-R4) \leq -0.59$; and $0.04 \leq d3/TTL \leq 0.13$, where
   f2 denotes a focal length of the second lens;
   R3 denotes a curvature radius of an object side surface of the second lens;
   R4 denotes a curvature radius of an image side surface of the second lens;
   d3 denotes an on-axis thickness of the second lens; and
   TTL denotes a total optical length from an object side surface of the first lens to an image plane of the camera optical lens along an optic axis.

5. The camera optical lens as described in claim 1, further satisfying following conditions:

$0.87 \leq f3/f \leq 4.31$;

$0.54 \leq (R5+R6)/(R5-R6) \leq 3.49$; and $0.04 \leq d5/TTL \leq 0.13$, where
   f3 denotes a focal length of the third lens;
   R5 denotes a curvature radius of an object side surface of the third lens;
   R6 denotes a curvature radius of the image side surface of the third lens; and
   TTL denotes a total optical length from an object side surface of the first lens to an image plane of the camera optical lens along an optic axis.

6. The camera optical lens as described in claim 5, further satisfying following conditions:

$-4.43 \leq f4/f \leq -1.05$; and $0.02 \leq d7/TTL \leq 0.09$, where f4 denotes a focal length of the fourth lens;

d7 denotes an on-axis thickness of the fourth lens; and

TTL denotes a total optical length from an object side surface of the first lens to an image plane of the camera optical lens along an optic axis.

7. The camera optical lens as described in claim 1, further satisfying following conditions:

$$0.55 \leq (R9+R10)/(R9-R10) \leq 2.25; \text{ and}$$

$$0.09 \leq d9/TTL \leq 0.38,$$

where

R9 denotes a curvature radius of an object side surface of the fifth lens;

R10 denotes a curvature radius of an image side surface of the fifth lens;

d9 denotes an on-axis thickness of the fifth lens; and

TTL denotes a total optical length from an object side surface of the first lens to an image plane of the camera optical lens along an optic axis.

8. The camera optical lens as described in claim 1, further satisfying following conditions:

$$-1.43 \leq f6/f \leq 0.26;$$

$$0.54 \leq (R11+R12)/(R11-R12) \leq 2.93; \text{ and}$$

$$0.03 d11/TTL \leq 0.13,$$

where f6 denotes a focal length of the sixth lens;

R11 denotes a curvature radius of an object side surface of the sixth lens;

R12 denotes a curvature radius of an image side surface of the sixth lens;

d11 denotes an on-axis thickness of the sixth lens; and

TTL denotes a total optical length from an object side surface of the first lens to an image plane of the camera optical lens along an optic axis.

9. The camera optical lens as described in claim 1, further satisfying a following condition:

$$TTL/IH \leq 1.65,$$

where

TTL denotes a total optical length from an object side surface of the first lens to an image plane of the camera optical lens along an optic axis; and IH denotes an image height of the camera optical lens.

* * * * *